US011198781B2

(12) United States Patent
Young et al.

(10) Patent No.: US 11,198,781 B2
(45) Date of Patent: Dec. 14, 2021

(54) POLYVINYL CHLORIDE, POLYCARBONATE AND COPOLYESTER COMPOSITIONS AND ARTICLES MADE USING THESE COMPOSITIONS

(71) Applicant: Eastman Chemical Company, Kingsport, TN (US)

(72) Inventors: Robert Erik Young, Kingsport, TN (US); Mark Allan Treece, Jonesborough, TN (US); Michael Eugene Donelson, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 16/946,293

(22) Filed: Jun. 15, 2020

(65) Prior Publication Data

US 2020/0308388 A1 Oct. 1, 2020

Related U.S. Application Data

(63) Continuation-in-part of application No. 16/220,013, filed on Dec. 14, 2018.

(51) Int. Cl.
*C08L 27/06* (2006.01)
*C08L 67/02* (2006.01)
*C08L 69/00* (2006.01)

(52) U.S. Cl.
CPC ......... *C08L 27/06* (2013.01); *C08L 2205/025* (2013.01); *C08L 2205/035* (2013.01); *C08L 2310/00* (2013.01)

(58) Field of Classification Search
None
See application file for complete search history.

(56) References Cited

U.S. PATENT DOCUMENTS

| | | | |
|---|---|---|---|
| 2,999,835 A | 9/1961 | Goldberg | |
| 3,028,365 A | 4/1962 | Schnell et al. | |
| 3,153,008 A | 10/1964 | Fox | |
| 3,169,121 A | 2/1965 | Goldberg | |
| 3,334,154 A | 8/1967 | Kim | |
| 3,686,361 A | 8/1972 | De Witt, III et al. | |
| 3,772,405 A | 11/1973 | Hamb | |
| 3,953,394 A | 4/1976 | Fox et al. | |
| 3,989,672 A | 11/1976 | Vestergaard | |
| 4,001,184 A | 1/1977 | Scott | |
| 4,001,192 A | 1/1977 | Reske et al. | |
| 4,018,750 A | 4/1977 | Onizawa | |
| 4,105,624 A | 8/1978 | Boehlke et al. | |
| 4,123,436 A | 10/1978 | Holub et al. | |
| 4,134,575 A | 1/1979 | Chavarria | |
| 4,698,390 A * | 10/1987 | Robeson | C08L 27/06 525/133 |
| 4,755,699 A | 7/1988 | Schmider | |
| 4,820,763 A | 4/1989 | Yang | |
| 5,248,546 A | 9/1993 | Greenlee | |
| 5,654,347 A | 8/1997 | Khemani et al. | |
| 5,696,176 A | 12/1997 | Khemani et al. | |
| 6,120,889 A | 9/2000 | Turner et al. | |
| 6,183,848 B1 | 2/2001 | Turner et al. | |
| 6,632,390 B1 | 10/2003 | Shelby et al. | |
| 7,235,623 B2 | 6/2007 | Strand et al. | |
| 8,822,020 B2 | 9/2014 | Grigo et al. | |
| 10,584,238 B2 | 3/2020 | Strand et al. | |
| 2003/0065075 A1 | 4/2003 | Flynn et al. | |
| 2006/0100394 A1 | 5/2006 | Hale | |
| 2008/0206535 A1 | 8/2008 | Grigo et al. | |
| 2010/0159176 A1* | 6/2010 | Hale | C08L 67/02 428/36.9 |
| 2012/0141761 A1 | 6/2012 | Deiringer et al. | |
| 2014/0010982 A1 | 1/2014 | Neil et al. | |
| 2015/0065637 A1 | 3/2015 | Sugioka et al. | |
| 2016/0108233 A1 | 4/2016 | Kann et al. | |
| 2018/0371225 A1 | 12/2018 | Strand et al. | |

FOREIGN PATENT DOCUMENTS

| | | | |
|---|---|---|---|
| CN | 103 881 260 A | 6/2014 | |
| CN | 108794908 A * | 11/2018 | ............ C08L 23/286 |
| DE | 100 22 997 A1 | 11/2001 | |
| DE | 10 2005 004857 A1 | 8/2006 | |
| EP | 0 118 706 A1 | 9/1984 | |
| EP | 0 229 487 A1 | 7/1987 | |
| EP | 0 744 439 A1 | 11/1996 | |
| EP | 1 066 339 B1 | 10/2003 | |
| JP | 03086734 A * | 4/1991 | ................ C08J 9/04 |

(Continued)

OTHER PUBLICATIONS

Machine translation of CN-108794908-A (No date).*
Machine translation of JP-2001294732-A (No date).*
Machine Translation of JP-04277560-A (no date).*
Butschli, Jim; "Gauging demand for calendered plastics"; Packaging World, May 31, 1997; retrieved from https://www.packworld.com/article/machinery/fillingsealing/dry-filling/guaging-demand-calendered-plastics on Jun. 18, 2018; 4 pages.
Crocker, Zenas and Gupta, Ved P.; "Chapter 3 Solid Vinyl Compound Systems"; Encyclopedia of PVC, Second Edition, Revised and Expanded, vol. 3: Compounding Processes, Product Design, and Specifications; 1992; pp. 99-123.
Demirel, Bilal et al., "Crystallization Behavior of PET Materials"; BAU Fen Bil. Enst. Dergisi Cilt, 13(1), 26-35, 2011.
Hanson, Ben et al.; "The Influence of Copolyester Composition on Adhesion to Soda-Lime Glass via Molecular Dynamics Simulations"; ACS Applied Materials & Interfaces, 8(21); Jun. 1, 2016, p. 13583-13589.
Summers, James W.; "Vinyl Chloride Polymers"; Kirk-Othmer Encyclopedia of Chemical Technology, vol. 24, 4th Edition; 1997; pp. 1017-1053.

(Continued)

*Primary Examiner* — Michael J Feely
(74) *Attorney, Agent, or Firm* — Tammye L. Taylor Polk

(57) ABSTRACT

This disclosure pertains to novel polyvinyl chloride compositions containing polyvinyl chloride resins, polycarbonate resins and copolyester resins. More particularly, the present disclosure pertains to polyvinyl chloride compositions including admixtures of polycarbonates and high glass transition temperature ($T_g$) copolyesters to increase the $T_g$ and the heat distortion temperature under load (HDTUL) of the polyvinyl chloride compositions.

28 Claims, 7 Drawing Sheets

(56) References Cited

FOREIGN PATENT DOCUMENTS

| JP | 04277560 A | * | 10/1992 | ............ C08L 101/00 |
| JP | 2001294732 A | * | 10/2001 | ............ C08L 67/02 |
| JP | 3577614 B2 | * | 10/2004 | ............ C08L 23/12 |
| WO | WO 2010 101562 A1 | | 9/2010 | |
| WO | WO 2016 069673 A1 | | 5/2016 | |

OTHER PUBLICATIONS

Titow, W. V.; "Chapter 18 Calendering of PVC"; PVC Technology, Fourth Edition; 1984; pp. 803-848.

Invitation to Pay Additional Fee and, Where Applicable, Protest Fee received in International Application No. PCT/US2018/036218 dated Aug. 20, 2018.

Notification of Transmittal of the International Search Report and the Written Opinion of the International Searching Authority, or the Declaration dated Jan. 25, 2019 received in International Application No. PCT/US2018/036218.

Co-pending U.S. Appl. No. 15/628,735, filed Jun. 21, 2017; Robert Erik Young; now U.S. Publication No. 2018-0371233.

Notification of Transmittal of the International Search Report and the Written Opinion of the International Searching Authority, or the Declaration dated Mar. 2, 2020 received in International Application No. PCT/US2019/065932.

"Benefits of PVC over other materials" (https ://web .archive.org/web/20160201010819/http://www.pvcconstruct.org/en/p/material); 2016.

Brostow, W. et al.; "Prediction of Glass Transition Temperatures: Binary Blends and Copolymers"; Materials Letters, 62; 2008; pp. 3152-3155.

Osimitz, Thomas G. et al.; "Lack of androgenicity and estrogenicity of the three monomers used in Eastman's Tritan copolyesters"; Food and Chemical Toxicology, 50; 2012; pp. 2196-2205.

Ultracki, L. A. et al.; "Glass Transition Temperature in Polymer Blends"; Advances in Polymer Technology, 5(1); Mar. 1985; pp. 33-39.

"What makes PVC important?" (https://web.archive.org/web/20160130102112/http://seepvcforum.com/en/content/45-what-makes-pvc-important) (2016).

"WIKIPEDIA—Polyvinyl Chloride"; https://en.wikipedia.org/wiki/Polyvinyl_chloride (webpage retrieved Feb. 19, 2019).

Non-Final Office Action date of notification Apr. 30, 2020 received in co-pending U.S. Appl. No. 15/628,735.

Final Office Action date of notification Nov. 13, 2020 received in co-pending U.S. Appl. No. 15/628,735.

Non-Final Office Action date of notification Apr. 1, 2021 received in co-pending U.S. Appl. No. 15/628,735.

Notification of Transmittal of the International Search Report and the Written Opinion of the International Searching Authority, or the Declaration dated Sep. 23, 2021 received in International Application No. PCT/US2021/036792.

* cited by examiner

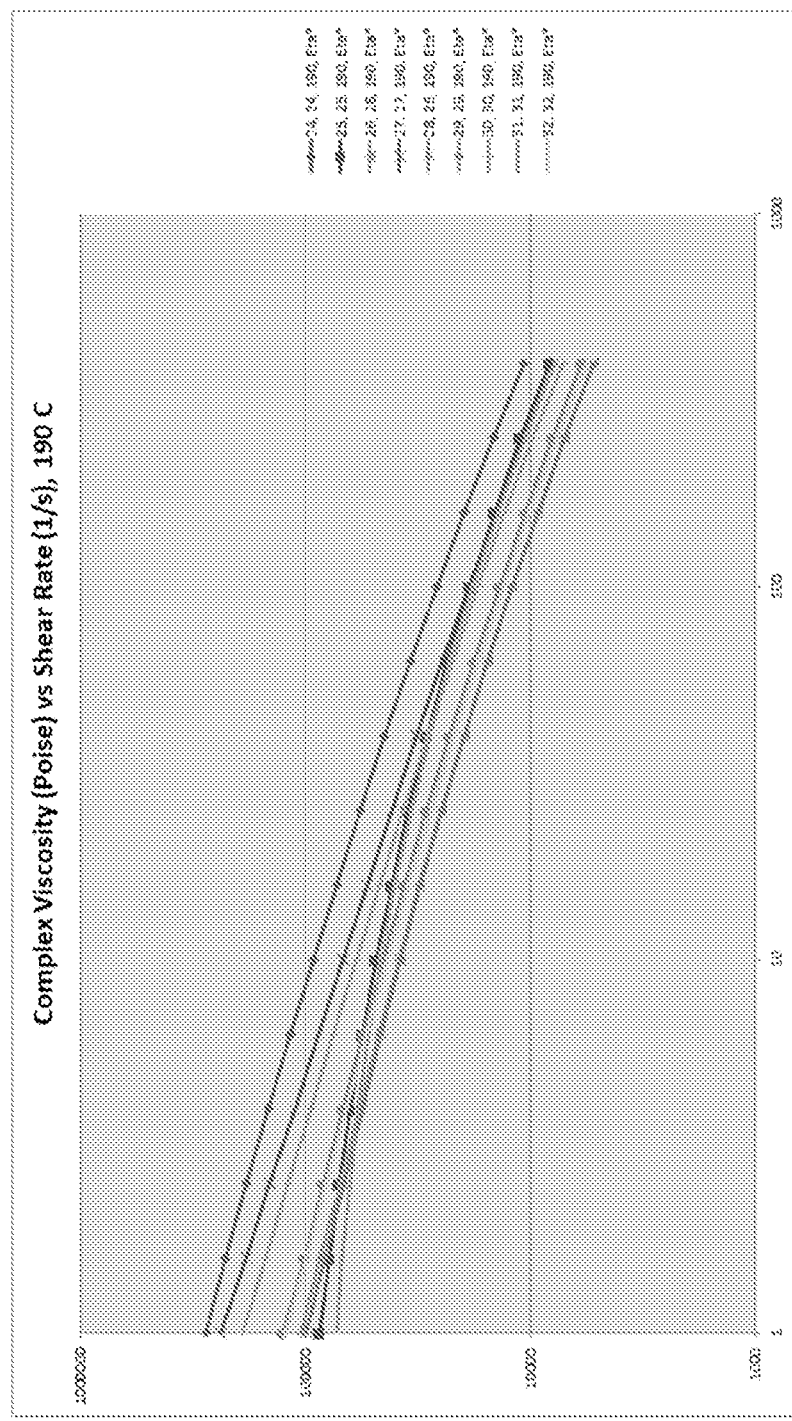
Figure 1. Complex Viscosity, HDT 1 and Mixtures of HDT 2 and HDT 3 at 80 phr, 190 °C

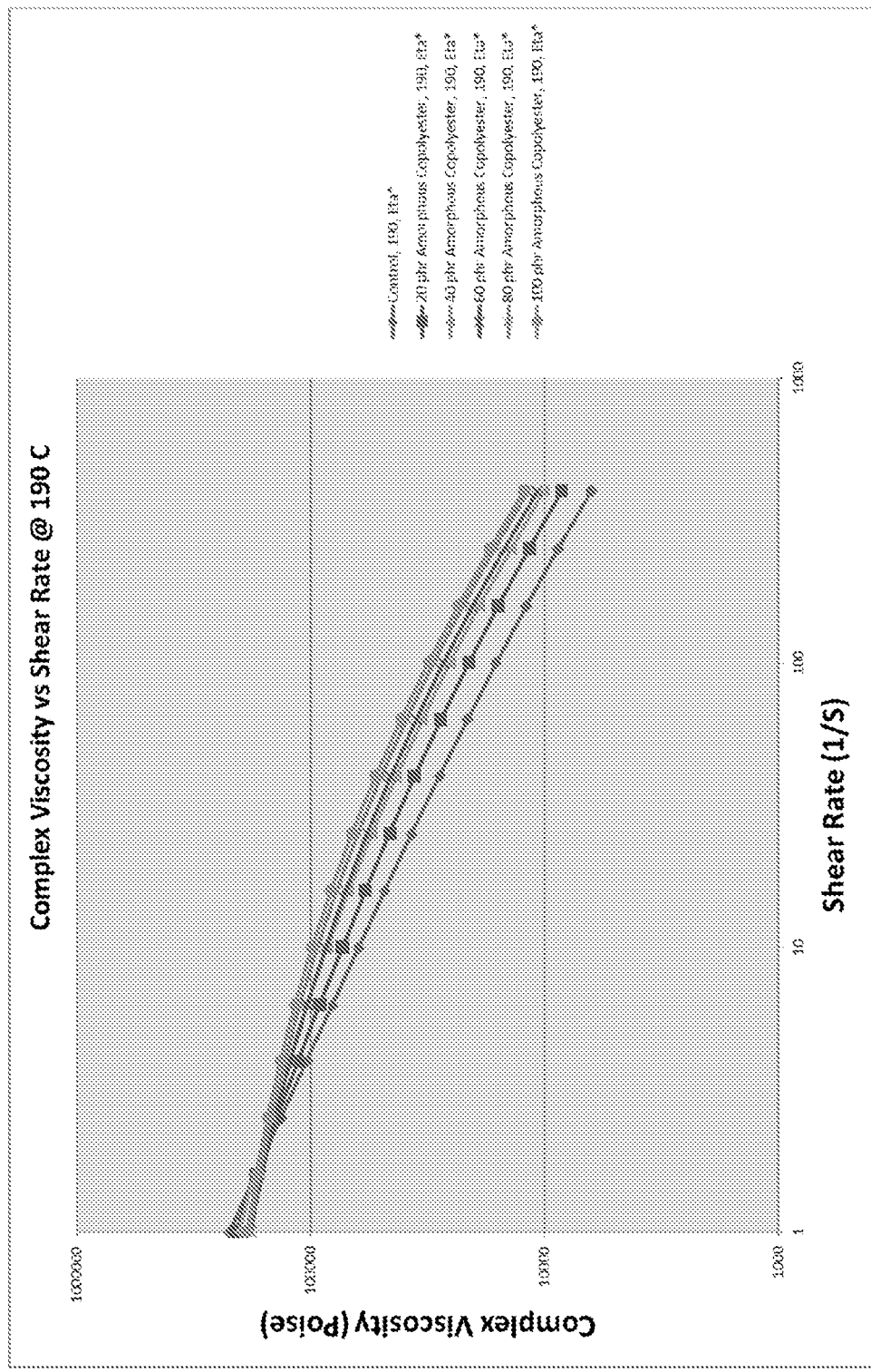
Figure 2. Complex Viscosity, Amorphous Copolyester at 20, 40, 60, 80, 100 phr, 190 °C

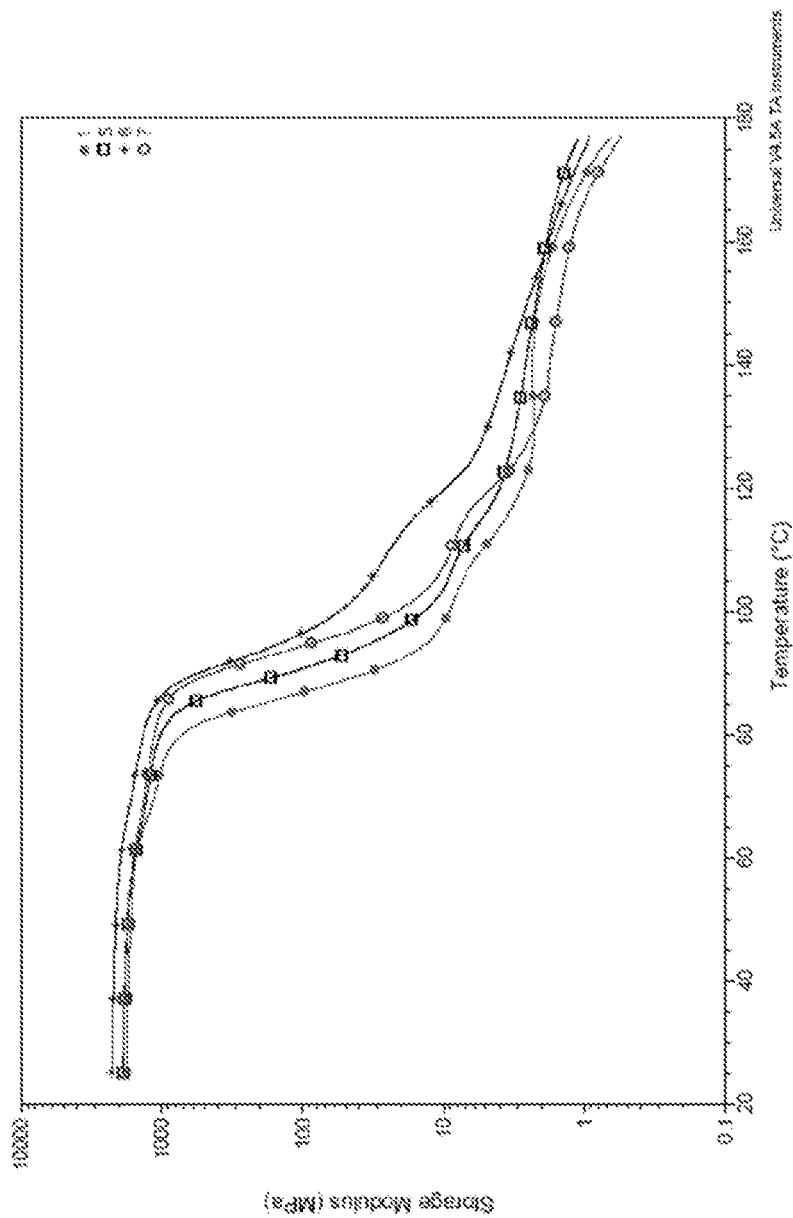
Figure 3. Storage Modulus, 30, 40, and 50 phr of HDT2

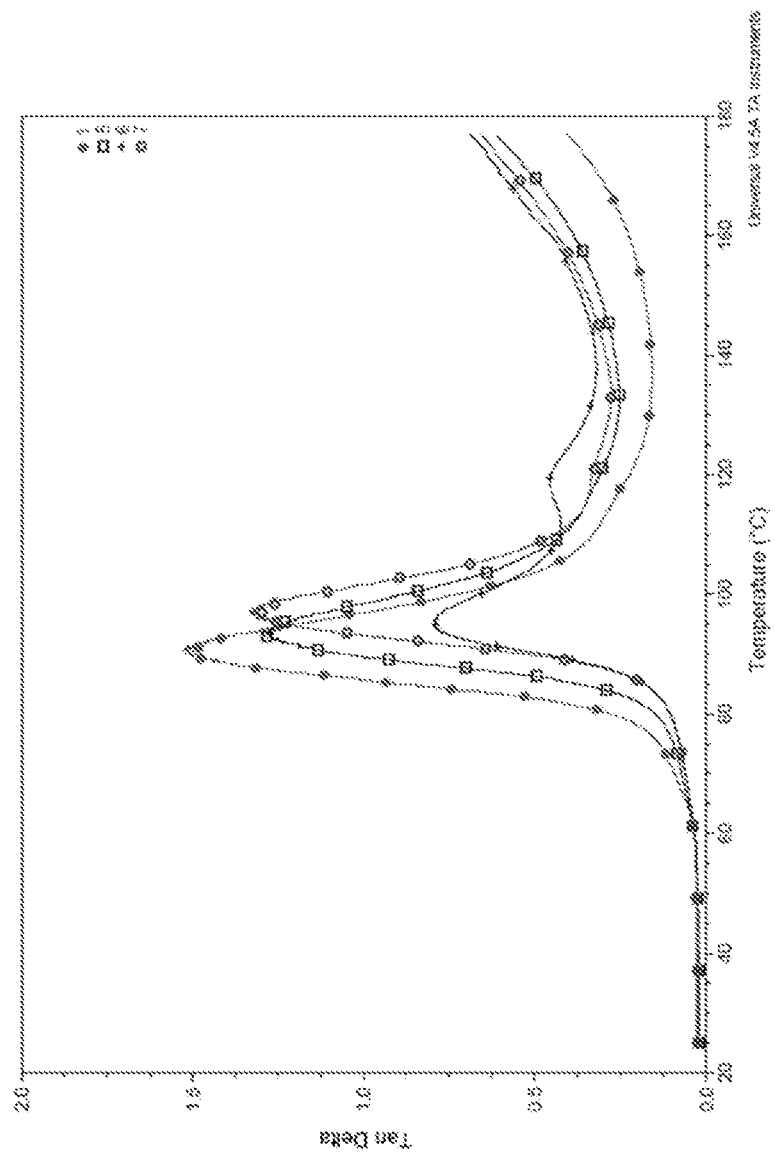
Figure 4. Tan Delta, 30, 40, and 50 phr of HDT2

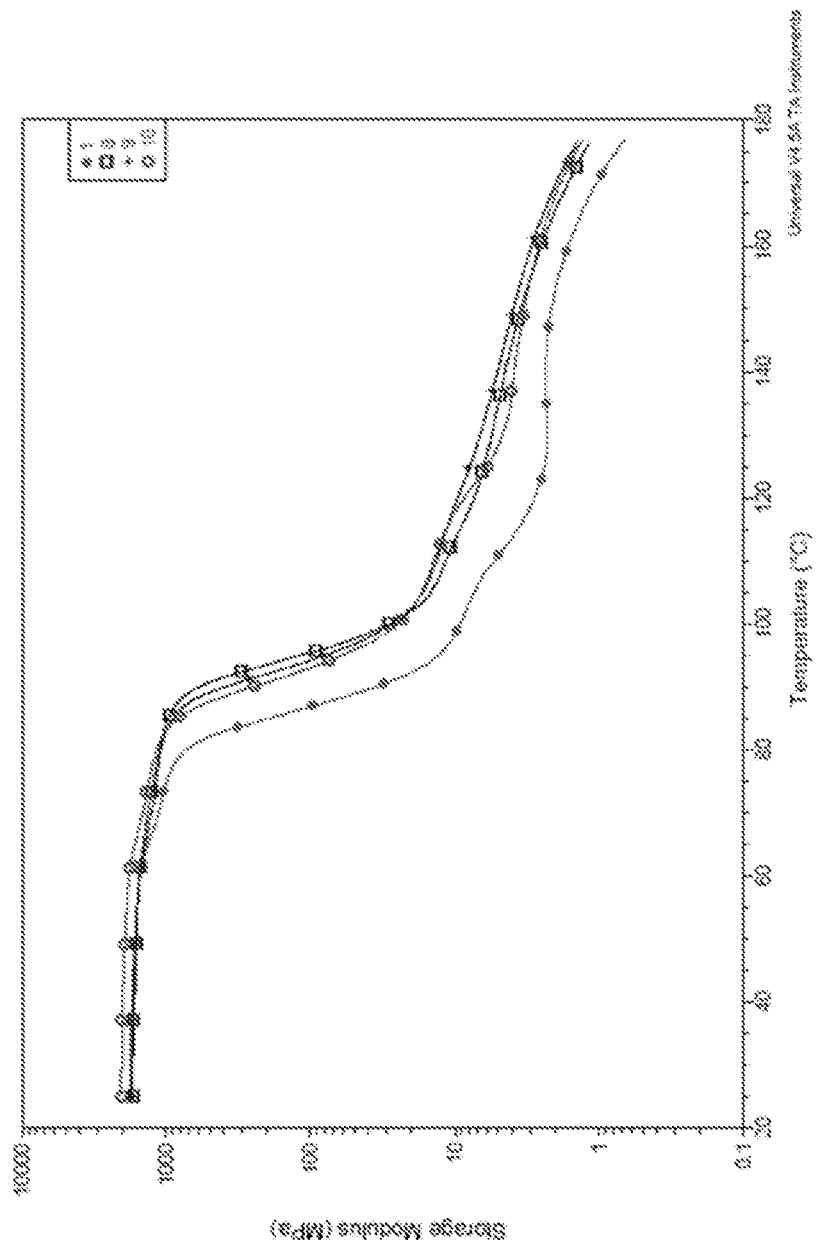
Figure 5. Storage Modulus, 30, 40, and 50 phr of HDT3

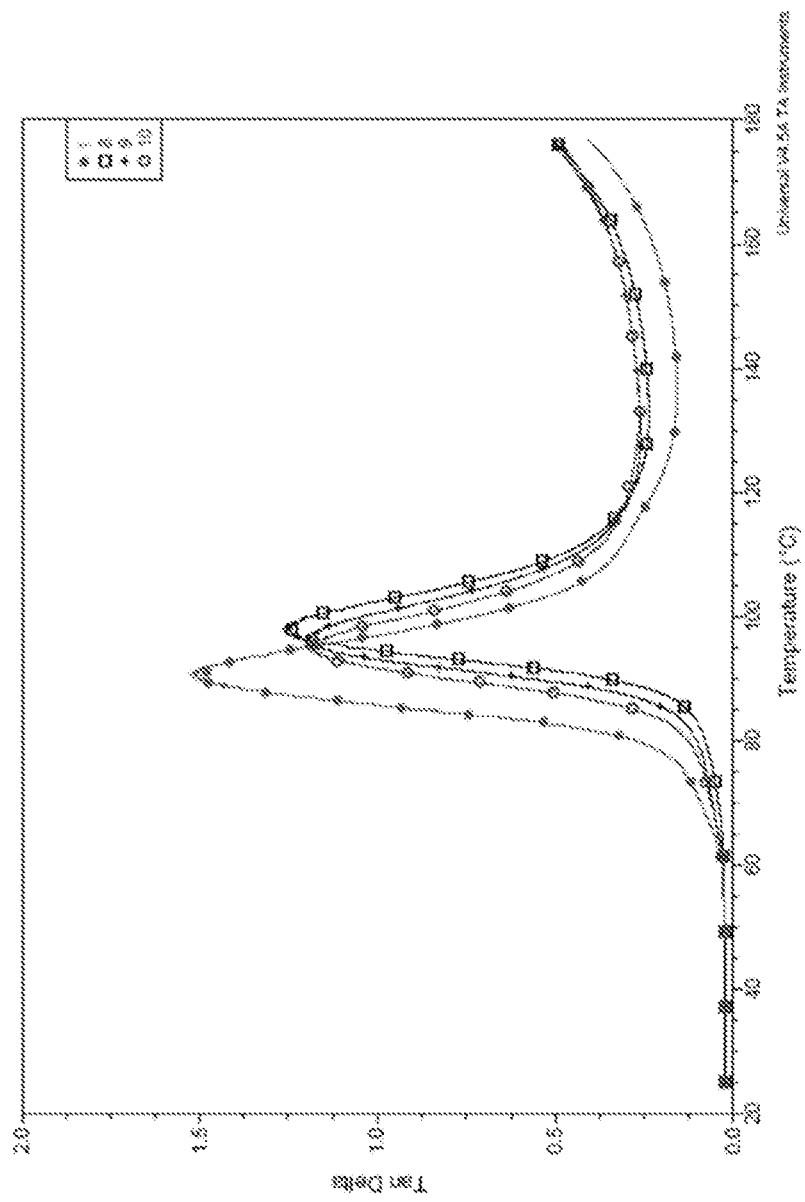
Figure 6. Tan Delta, 30, 40, and 50 phr of HDT2

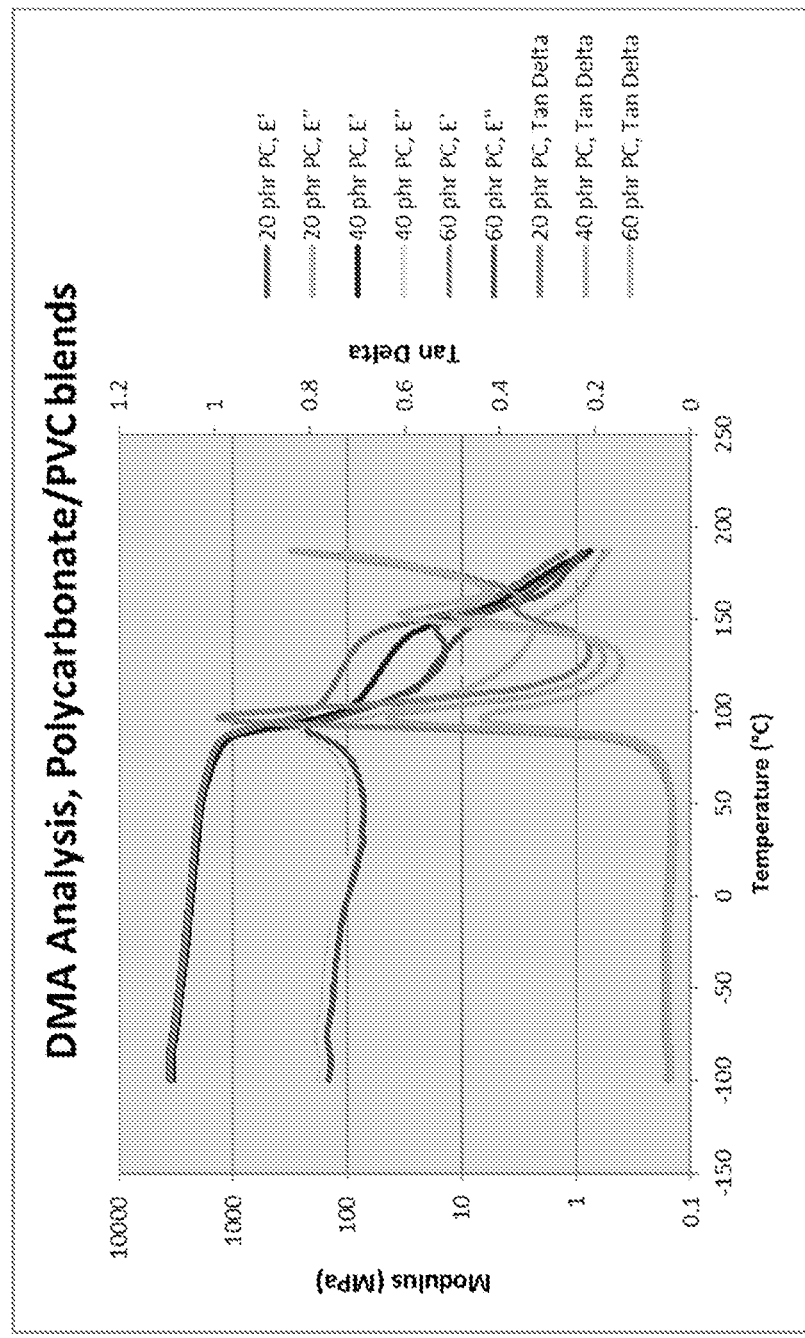
Figure 7. Dynamic Mechanical Analysis, Polycarbonate

POLYVINYL CHLORIDE, POLYCARBONATE AND COPOLYESTER COMPOSITIONS AND ARTICLES MADE USING THESE COMPOSITIONS

CROSS-REFERENCE TO RELATED APPLICATION(S)

This application is a continuation-in-part which claims priority to U.S. application Ser. No. 16/220,013, filed on Dec. 14, 2018, the entire disclosure of which is incorporated by reference herein.

FIELD

This disclosure pertains to novel polyvinyl chloride compositions. More particularly, this disclosure pertains to novel compositions containing polyvinyl chloride resins, polycarbonate resins and copolyester resins. More particularly, the present disclosure pertains to polyvinyl chloride compositions including admixtures of polycarbonate resins and high glass transition temperature ($T_g$) copolyester resins to increase the $T_g$ and the heat distortion temperature under load (HDTUL) of the polyvinyl chloride compositions.

BACKGROUND

Rigid Polyvinyl Chloride (PVC) formulations have been used for many years to make articles such as vinyl siding, window profiles, decking profiles, fencing and railings. These products have typically been limited to lighter colors such as white, off-white, beige or light pastel greens, blues, and yellows, but dark, intense colors are not typically offered. The reason for being limited to light colors is that these formulations can exceed the glass transition temperature ($T_g$) and the heat distortion temperature under load (HDTUL) of the rigid PVC formulations due to high temperatures and the absorption of the infra-red portion of the solar spectrum.

Manufacturers of these products have had to limit their design and color offerings to reduce the distortion of these products. Or they have attempted to use materials such as alpha-methyl styrene acrylonitrile copolymer (AMSAN) to increase the Tg and HDTUL of the PVC formulations. These options have drawbacks and often limit the geographical areas where these products can be used, or they create processing and product deficiencies that must be addressed. For example, AMSAN results in thermal stability degradation, increased yellowing and a loss of impact properties. In the present disclosure, it has been surprisingly discovered that certain polycarbonate resins and high Tg copolyester compositions are melt processable at typical rigid PVC processing temperatures with no detrimental effects to processing properties and that they increase the Tg and HDTUL with no loss of impact properties.

SUMMARY

The polyvinyl chloride compositions of the present disclosure comprise at least one polyvinyl chloride resin, at least one polycarbonate resin and at least one copolyester resin.

One embodiment of the present disclosure is a polyvinyl chloride composition comprising at least one polyvinyl chloride resin, at least one polycarbonate resin and at least one copolyester resin which comprises:

(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 20 to about 60 mole % of a modifying glycol consisting of 2 to 20 carbon atoms and
  (ii) about 40 to about 80 mole % of a second modifying glycol consisting of 2 to 20 carbon atoms,
wherein the total mole % of the dicarboxylic acid component is 100 mole %, and wherein the total mole % of the glycol component is 100 mole %.

One embodiment of the present disclosure is a polyvinyl chloride composition comprising at least one polyvinyl chloride resin, at least one polycarbonate resin and at least one copolyester resin which comprises:

(a) a dicarboxylic acid component comprising:
  (i) about 50 to about 100 mole % of terephthalic acid residues;
  (ii) about 0 to about 50 mole % of aromatic and/or aliphatic dicarboxylic acid residues having up to 20 carbon atoms; and
(b) a glycol component comprising:
  (i) about 60 to about 100 mole % of a modifying glycol consisting of 2 to 20 carbon atoms; and
  (ii) about 0 to about 40 mole % of a second modifying glycol consisting of 2 to 20 carbon atoms;
wherein the total mole % of the dicarboxylic acid component is 100 mole %, and wherein the total mole % of the glycol component is 100 mole %.

In one embodiment, the Tg of the copolyester is at least about 90° C. or higher.

In one embodiment, the Tg of the copolyester is at least about 100° C. or higher.

In one embodiment, the copolyester is amorphous.

In one embodiment, the copolyester has a crystallization half time of about 5 minutes or greater.

In one embodiment, the copolyester resin content in the PVC composition is about 1 to about 100 parts per hundred resin (phr) based on the PVC resin content in the composition.

In one embodiment, the polycarbonate resin content in the PVC composition is about 1 to about 50 parts per hundred resin (phr) based on the PVC resin content in the composition.

In one embodiment, the polycarbonate resin content in the PVC composition is about 1 to about 50 parts per hundred resin (phr) and the copolyester resin content is about 1 to about 100 parts per hundred resin (phr) based on the PVC resin content in the composition.

In one embodiment, the polyvinyl chloride compositions are rigid.

In one embodiment, the polyvinyl chloride resin is a polyvinyl chloride resin, a chlorinated polyvinyl chloride resin, or alloys thereof.

In one embodiment, the polycarbonate resin is a bisphenol based polycarbonate resin.

The composition of claim 1 or 2, wherein the ratio of polyvinyl chloride resin:copolyester on a weight fraction basis is greater than about 1.

The composition of claim 1 or 2, wherein the ratio of polyvinyl chloride resin:copolyester and polycarbonate on a weight fraction basis is greater than about 1.

One embodiment of the present disclosure is a method of producing a polyvinyl chloride composition comprising:

extruding at least one polyvinyl chloride resin composition, at least one polycarbonate resin and at least one copolyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 20 to about 60 mole % of a modifying glycol consisting of 2 to 20 carbon atoms and
(ii) about 40 to about 80 mole % of a second modifying glycol consisting of 2 to 20 carbon atoms, wherein the total mole % of the dicarboxylic acid component is 100 mole %, and wherein the total mole % of the glycol component is 100 mole %, to produce a viscous blend of thermoplastic material,
introducing the blend of thermoplastic material into a calendering, extrusion or injection molding process to produce polyvinyl chloride articles.

One embodiment of the present disclosure is a method of producing a polyvinyl chloride composition comprising: extruding at least one polyvinyl chloride resin composition, at least one polycarbonate resin and at least one copolyester which comprises:
(a) a dicarboxylic acid component comprising:
(i) about 50 to about 100 mole % of terephthalic acid residues;
(ii) about 0 to about 50 mole % of aromatic and/or aliphatic dicarboxylic acid residues having up to 20 carbon atoms; and
(b) a glycol component comprising:
(i) about 60 to about 100 mole % of a modifying glycol consisting of 2 to 20 carbon atoms; and
(ii) about 0 to about 40 mole % of a second modifying glycol consisting of 2 to 20 carbon atoms;
wherein the total mole % of the dicarboxylic acid component is 100 mole %, and wherein the total mole % of the glycol component is 100 mole %, to produce a viscous blend of thermoplastic material, introducing the blend of thermoplastic material into a calendering, extrusion or injection molding process to produce polyvinyl chloride articles.

One embodiment of the present disclosure is a method of producing a polyvinyl chloride composition comprising: compounding a miscible admixture of at least one polycarbonate resin and at least one copolyester resin which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 20 to about 60 mole % of a modifying glycol consisting of 2 to 20 carbon atoms and
(ii) about 40 to about 80 mole % of a second modifying glycol consisting of 2 to 20 carbon atoms,
wherein the total mole % of the dicarboxylic acid component is 100 mole %, and wherein the total mole % of the glycol component is 100 mole %,
to produce a viscous thermoplastic material;
blending the compound with at least one polyvinyl chloride resin composition; and introducing the blend into a calendering, extrusion or injection molding process to produce polyvinyl chloride articles.

One embodiment of the present disclosure is a method of producing a polyvinyl chloride composition comprising: compounding with at least one polycarbonate resin and at least one copolyester resin which comprises:
(a) a dicarboxylic acid component comprising:
(i) about 50 to about 100 mole % of terephthalic acid residues;
(ii) about 0 to about 50 mole % of aromatic and/or aliphatic dicarboxylic acid residues having up to 20 carbon atoms; and
(b) a glycol component comprising:
(i) about 60 to about 100 mole % of a modifying glycol consisting of 2 to 20 carbon atoms; and
(ii) about 0 to about 40 mole % of a second modifying glycol consisting of 2 to 20 carbon atoms; wherein the total mole % of the dicarboxylic acid component is 100 mole %, and wherein the total mole % of the glycol component is 100 mole %, to produce a viscous thermoplastic material;
blending the compound into at least one polyvinyl chloride resin composition; and
introducing the blend into a calendering, extrusion or injection molding process to produce polyvinyl chloride articles.

One embodiment of the present disclosure is polyvinyl chloride articles with an increase in Tg and HDTUL (heat distortion temperature under load) of at least 3° C.

One embodiment of the present disclosure is polyvinyl chloride articles with a Tg up to 110° C. or a HDTUL of up to 130° C.

BRIEF DESCRIPTION OF THE DRAWINGS

FIG. 1 illustrates that as that the polycarbonate/copolyester admixtures are blended with the PVC compositions they tend to lower the complex viscosity (mPa) compared to the PVC control at all shear rates measured.

FIG. 2 illustrates that as high glass transition temperature copolyester/polycarbonate admixtures are blended with the PVC compositions, the complex viscosity (mPa) tends to increase compared to the PVC control at all shear rates measured.

FIG. 3 illustrates that blending admixtures of 50% copolyester and 50% polycarbonate with PVC compositions increases the storage modulus (mPa) vs temperature compared to the PVC control indicating that the glass transition temperatures are increasing as the amount of the admixtures is increased.

FIG. 4 illustrates that blending admixtures of 50% copolyester and 50% polycarbonate with PVC compositions results in a single Tan Delta peak that increases at higher loading levels indicating a single glass transition temperature is present and that the admixtures are miscible in PVC.

FIG. 5 illustrates that blending admixtures of 25% copolyester and 75% polycarbonate with PVC compositions increases the storage modulus (mPa) vs temperature compared to the PVC control indicating that the glass transition temperatures are increasing as the amount of the admixture increases.

FIG. 6 illustrates that blending admixtures of 25% copolyester and 75% polycarbonate with PVC compositions results in a single Tan Delta peak that increases at higher loading levels indicating a single glass transition temperature is present and that the admixtures are miscible in PVC.

FIG. 7 illustrates that PVC and polycarbonate are immiscible and do not form a single glass transition temperature; as the amount of polycarbonate increases, two distinct glass transition temperatures are present as shown by the Tan Delta readings.

DETAILED DESCRIPTION

The polyvinyl alcohol compositions of the present disclosure comprise at least one polyvinyl chloride resin, at least one polycarbonate resin and at least one copolyester.

One embodiment of the present disclosure is a polyvinyl chloride composition comprising at least one polyvinyl chloride resin, at least one polycarbonate resin and at least one copolyester which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 20 to about 60 mole % of a modifying glycol consisting of 2 to 20 carbon atoms and
    (ii) about 40 to about 80 mole % of a second modifying glycol consisting of 2 to 20 carbon atoms,
    wherein the total mole % of the dicarboxylic acid component is 100 mole %, and wherein the total mole % of the glycol component is 100 mole %.

One embodiment of the present disclosure is a polyvinyl chloride composition comprising at least one polyvinyl chloride resin, at least one polycarbonate resin and at least one copolyester which comprises:
  (a) a dicarboxylic acid component comprising:
    (i) about 50 to about 100 mole % of terephthalic acid residues;
    (ii) about 0 to about 50 mole % of aromatic and/or aliphatic dicarboxylic acid residues having up to 20 carbon atoms; and
  (b) a glycol component comprising:
    (i) about 60 to about 100 mole % of a modifying glycol consisting of 2 to 20 carbon atoms; and
    (ii) about 0 to about 40 mole % of a second modifying glycol consisting of 2 to 20 carbon atoms;
    wherein the total mole % of the dicarboxylic acid component is 100 mole %, and wherein the total mole % of the glycol component is 100 mole %.

Any amorphous or essentially amorphous copolyesters are suitable for use in the present disclosure. For example, in one embodiment, any copolyesters can be used in this disclosure provided that they are essentially amorphous and have a minimum crystallization half-time of at least about 5 minutes, or at least about 7 minutes. In one embodiment, any copolyester can be used provided that its minimum crystallization half-time is at least about 8 minutes. In another embodiment, any copolyester can be used provided that its crystallization half-time is at least about 10 minutes. The amorphous copolyesters in the present disclosure can, in some embodiments, have crystallization half-times up to infinity. In one aspect of the present disclosure, blends the amorphous copolyesters with other polymers (including other polyesters and copolyesters) are suitable for use provided that the blend has a minimum crystallization half-time of at least about 5 minutes.

Crystallization half-times can be measured using a differential scanning calorimeter according to the following procedure. A sample of about 10.0 mg of the copolyester is sealed in an aluminum pan and heated at a rate of about 20° C./min to about 290° C. and held for about 2 minutes in a helium atmosphere. The sample is then cooled immediately at a rate of about 20° C./min to an isothermal crystallization temperature ranging from about 140° C. to about 200° C. with about a 10° C. interval. The crystallization half-time at each temperature is then determined as the time needed to reach the peak on the exothermic curve. The minimum crystallization half-time is the temperature at which the crystallization rate is the fastest.

In one embodiment of the present disclosure, the copolyester comprises
  (a) a dicarboxylic acid component comprising:
    (i) about 50 to about 100 mole % of terephthalic acid residues;
    (ii) about 0 to about 50 mole % of aromatic and/or aliphatic dicarboxylic acid residues having up to 20 carbon atoms; and
  (b) a glycol component comprising:
    (i) about 20 to about 60 mole % of a modifying glycol consisting of 2 to 20 carbon atoms and
    (ii) about 40 to about 80 mole % of a second modifying glycol consisting of 2 to 20 carbon atoms,
    wherein the total mole % of the dicarboxylic acid component is 100 mole %, and wherein the total mole % of the glycol component is 100 mole %.

In another embodiment, the copolyester comprises:
  (a) a dicarboxylic acid component comprising:
    (i) about 50 to about 100 mole % of terephthalic acid residues;
    (ii) about 0 to about 50 mole % of aromatic and/or aliphatic dicarboxylic acid residues having up to 20 carbon atoms; and
  (b) a glycol component comprising:
    (i) about 60 to about 100 mole % of a modifying glycol consisting of 2 to 20 carbon atoms; and
    (ii) about 0 to about 40 mole % of a second modifying glycol consisting of 2 to 20 carbon atoms;
    wherein the total mole % of the dicarboxylic acid component is 100 mole %, and wherein the total mole % of the glycol component is 100 mole %.

Unless the context clearly suggests otherwise, the terms "polyester" and "copolyester" are used interchangeably herein. The term "polyester" is intended to include "copolyesters" and is understood to mean a synthetic polymer prepared by the polycondensation of one or more difunctional carboxylic acids (or diacids) with one or more difunctional hydroxyl compounds (or diols). In one embodiment, the difunctional carboxylic acid is a dicarboxylic acid and the difunctional hydroxyl compound is a dihydric alcohol such as, for example, glycols and diols.

The term "residue" means any organic structure incorporated into a polymer through a polycondensation reaction involving the corresponding monomer. The term "repeating unit" means an organic structure having a dicarboxylic acid residue (or diacid component) and a diol residue (or diol component) bonded through a carbonyloxy group. Thus, the dicarboxylic acid residues may be derived from a dicarboxylic acid monomer or its associated acid halides, esters, salts, anhydrides, or mixtures thereof.

In one embodiment, the copolyesters of the present disclosure are amorphous. In one embodiment, the copolyesters of the present disclosure are essentially amorphous.

In one embodiment, the copolyesters contain repeat units from a dicarboxylic acid and a diol, based on 100 mole percent of dicarboxylic acid residues and 100 mole percent of diol residues, respectively.

In one embodiment, the diacid component contains at least about 50 mole percent of the residues of an aromatic dicarboxylic acid having about 8 to about 14 carbon atoms. The copolyester may optionally be modified with up to about 50 mole percent, based on 100 mole percent of dicarboxylic acid residues, of the residues of one or more different dicarboxylic acids other than an aromatic dicarboxylic acid, such as saturated aliphatic dicarboxylic acids having 4 to 12 carbon atoms and cycloaliphatic dicarboxylic acids having 8 to 12 carbon atoms. Specific examples of dicarboxylic acids include terephthalic acid, phthalic acid, isophthalic acid, naphthalene dicarboxylic acid, 1,4-cyclohexane dicarboxylic acid, cyclohexane diacetic acid, diphenyl-4,4'-dicarboxylic acid, succinic acid, glutaric acid, adipic acid, azelaic acid, sebacic acid, and the like. The polyester may be prepared from one or more of the above dicarboxylic acids.

It should be understood that use of the corresponding acid anhydrides, esters, and acid chlorides of these acids is included in the term "dicarboxylic acid."

In one embodiment, diol component contains at least about 60 mole percent of the residues of a diol containing 2 to 20 carbon atoms. In addition, the diol component may optionally be modified with up to about 40 mole percent, based on 100 mole percent of diol residues, of the residues of one or more other diols. Specific examples of diols include ethylene glycol, diethylene glycol, triethylene glycol, isosorbide, propane-1,3-diol, butane-1,4-diol, 2,2-dimethylpropane-1,3-diol (neopentyl glycol), 2,2,4,4,-tetramethyl-1,3-cyclobutanediol, pentane-1,5-diol, hexane-1,6-diol, 1,4-cyclohexanedimethanol, 3-methyl-pentanediol-(2,4), 2-methylpentanediol-(1,4), 2,2,4-tri-methylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like. The polyester may be prepared from one or more of the above diols.

In one embodiment, the diacid component contains at least about 90 mole percent of the residues of an aromatic dicarboxylic acid having about up to 20 carbon atoms. The copolyester may optionally be modified with up to about 10 mole percent, based on 100 mole percent of dicarboxylic acid residues, of the residues of one or more different dicarboxylic acids other than an aromatic dicarboxylic acid, such as saturated aliphatic dicarboxylic acids having 4 to 12 carbon atoms and cycloaliphatic dicarboxylic acids having 8 to 12 carbon atoms. Specific examples of dicarboxylic acids include terephthalic acid, phthalic acid, isophthalic acid, naphthalene dicarboxylic acid, 1,4-cyclohexane dicarboxylic acid, cyclohexane diacetic acid, diphenyl-4,4'-dicarboxylic acid, succinic acid, glutaric acid, adipic acid, azelaic acid, sebacic acid, and the like. The polyester may be prepared from one or more of the above dicarboxylic acids.

It should be understood that use of the corresponding acid anhydrides, esters, and acid chlorides of these acids is included in the term "dicarboxylic acid."

In one embodiment, diol component contains at least about 20 mole percent of the residues of a diol containing 2 to 20 carbon atoms. In addition, the diol component may optionally be modified with up to about 80 mole percent, based on 100 mole percent of diol residues, of the residues of one or more other diols. Specific examples of diols include ethylene glycol, diethylene glycol, triethylene glycol, isosorbide, propane-1,3-diol, butane-1,4-diol, 2,2-dimethylpropane-1,3-diol (neopentyl glycol), 2,2,4,4,-tetramethyl-1,3-cyclobutanediol, pentane-1,5-diol, hexane-1,6-diol, 1,4-cyclohexanedimethanol, 3-methyl-pentanediol-(2,4), 2-methylpentanediol-(1,4), 2,2,4-tri-methylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like. The polyester may be prepared from one or more of the above diols.

The polyester may also contain small amounts of trifunctional or tetrafunctional co-monomers such as trimellitic anhydride, trimethylolpropane, pyromellitic dianhydride, pentaerythritol, and other polyester forming polyacids or polyols generally known in the art.

In one embodiment, the copolyester comprises (i) a diacid component comprising at least about 50 mole percent of residues of terephthalic acid, naphthalenedicarboxylic acid, 1,4-cyclohexanedicarboxylic acid, isophthalic acid, or mixtures thereof; and (ii) a diol component comprising at least about 80 mole percent of residues of a diol containing 2 to 10 carbon atoms. In one embodiment, the diacid component of the copolyester comprises at least about 80 mole percent of the residues of terephthalic acid, naphthalenedicarboxylic acid, 1,4-cyclohexanedicarboxylic acid, isophthalic acid, or mixtures thereof. And in one embodiment, the diol component of the copolyester comprises the residues of ethylene glycol, 1,4-cyclohexanedimethanol, diethylene glycol, neopentyl glycol, 2,2,4,4-tetramethyl-1,3-cyclobutanediol, or mixtures thereof.

In another embodiment, the copolyester comprises (i) a diacid component comprising at least about 80 mole percent of terephthalic acid residues, and (ii) a diol component comprising at least about 80 mole percent of the residues of ethylene glycol and 1,4-cyclohexanedimethanol. In yet another embodiment, the copolyester comprises (i) a diacid component comprising at least about 80 mole percent of terephthalic acid residues, and (ii) a diol component comprising at least about 80 mole percent of the residues of ethylene glycol, 1,4-cyclohexanedimethanol, and diethylene glycol. In yet another embodiment, the copolyester comprises (i) a diacid component comprising at least about 80 mole percent of terephthalic acid residues, and (ii) a diol component comprising at least about 80 mole percent of residues of ethylene glycol and neopentyl glycol. In yet another embodiment, the copolyester comprises (i) a diacid component comprising at least about 80 mole percent of terephthalic acid residues, and (ii) a diol component comprising at least about 80 mole percent of the residues of 1,4-cyclohexanedimethanol and 2,2,4,4-tetramethyl-1,3-cycobutanediol.

In one embodiment, the copolyester composition comprises at least one polyester which comprises:
 (a) a dicarboxylic acid component comprising:
  (i) 70 to 100 mole % of terephthalic acid residues, and
  (ii) 0 to 30 mole % of aromatic and/or aliphatic dicarboxylic acid residues having up to 20 carbon atoms; and
 (b) a glycol component comprising:
  (i) 0 to 40 mole % 2,2-dimethylpropane-1,3-diol (neopentyl glycol or NPG) residues;
  (ii) 0 to 100 mole % 1,4-cyclohexanedimethanol (CHDM) residues;
  (iii) 0 to 70 mole % 2,2,4,4-tetramethyl-1,3-cyclobutanediol (TMCD) residues;
  (iv) 0 to 40 mole percent diethylene glycol (DEG) residues, whether or not formed in situ;

wherein the remainder of the glycol component comprises:
  (v) residues of ethylene glycol, and
  (vi) optionally, 0 to 10 mole % of the residues of at least one other modifying glycol;
wherein the total mole % of the dicarboxylic acid component is 100 mole %, and wherein the total mole % of the glycol component is 100 mole %.

In one embodiment, the copolyester composition comprises at least one polyester which comprises:
  (a) a dicarboxylic acid component comprising:
    (i) 70 to 100 mole % of terephthalic acid residues, and
    (ii) 0 to 30 mole % of aromatic and/or aliphatic dicarboxylic acid residues having up to 20 carbon atoms; and
  (b) a glycol component comprising:
    (i) 10 to 70 mole % 2,2,4,4-tetramethyl-1,3-cyclobutanediol (TMCD) residues;
    (ii) 0 to 40 mole % 1,4-cyclohexanedimethanol (CHDM) residues;
    (iii) 0 to 10 mole percent diethylene glycol (DEG) residues, whether or not formed in situ;
  wherein the remainder of the glycol component comprises:
    (iv) residues of ethylene glycol, and
    (v) optionally, 0 to 10 mole % of the residues of at least one other modifying glycol;
wherein the total mole % of the dicarboxylic acid component is 100 mole %, and wherein the total mole % of the glycol component is 100 mole %.

In one embodiment, the copolyester composition comprises at least one polyester which comprises:
  (a) a dicarboxylic acid component comprising:
    (i) 70 to 100 mole % of terephthalic acid residues, and
    (ii) 0 to 30 mole % of aromatic and/or aliphatic dicarboxylic acid residues having up to 20 carbon atoms; and
  (b) a glycol component comprising:
    (i) 10 to 70 mole % 2,2,4,4-tetramethyl-1,3-cyclobutanediol (TMCD) residues;
    (ii) 30 to 90 mole % 1,4-cyclohexanedimethanol (CHDM) residues;
    (iii) 0 to 10 mole percent diethylene glycol (DEG) residues, whether or not formed in situ;
  wherein the remainder of the glycol component comprises:
    (iv) residues of ethylene glycol, and
    (v) optionally, 0 to 10 mole % of the residues of at least one other modifying glycol;
wherein the total mole % of the dicarboxylic acid component is 100 mole %, and wherein the total mole % of the glycol component is 100 mole %.

In one embodiment, the copolyester composition comprises at least one polyester which comprises:
  (a) a dicarboxylic acid component comprising:
    (i) 70 to 100 mole % of terephthalic acid residues, and
    (ii) 0 to 30 mole % of aromatic and/or aliphatic dicarboxylic acid residues having up to 20 carbon atoms; and
  (b) a glycol component comprising:
    (i) 20 to 60 mole % 2,2,4,4-tetramethyl-1,3-cyclobutanediol (TMCD) residues;
    (ii) 40 to 80 mole % 1,4-cyclohexanedimethanol (CHDM) residues;
    (iii) 0 to 10 mole percent diethylene glycol (DEG) residues, whether or not formed in situ;
  wherein the remainder of the glycol component comprises:
    (iv) residues of ethylene glycol, and
    (v) optionally, 0 to 10 mole % of the residues of at least one other modifying glycol;
wherein the total mole % of the dicarboxylic acid component is 100 mole %, and wherein the total mole % of the glycol component is 100 mole %.

In one embodiment, the copolyester composition comprises at least one polyester which comprises:
  (a) a dicarboxylic acid component comprising:
    (i) 70 to 100 mole % of terephthalic acid residues, and
    (ii) 0 to 30 mole % of aromatic and/or aliphatic dicarboxylic acid residues having up to 20 carbon atoms; and
  (b) a glycol component comprising:
    (i) 20 to 40 mole % 2,2,4,4-tetramethyl-1,3-cyclobutanediol (TMCD) residues;
    (ii) 60 to 80 mole % 1,4-cyclohexanedimethanol (CHDM) residues;
    (iii) 0 to 10 mole percent diethylene glycol (DEG) residues, whether or not formed in situ;
  wherein the remainder of the glycol component comprises:
    (iv) residues of ethylene glycol, and
    (v) optionally, 0 to 10 mole % of the residues of at least one other modifying glycol;
wherein the total mole % of the dicarboxylic acid component is 100 mole %, and wherein the total mole % of the glycol component is 100 mole %.

In certain embodiments, the condensation polymer comprises residues of at least two diol residues. In certain embodiments, the condensation polymer is a polyester comprising at least one dicarboxylic acid or an ester thereof and at least two diols, wherein the total of acid residues present is 100 mole % and wherein the total of diol residues is 100 mole %. In certain embodiments, the condensation polymer, e.g., polyester, comprises 1,4-cyclohexanedimethanol residues.

For example, for TMCD-CHDM copolyesters (polymers comprising 2,2,4,4-tetramethyl-1,3-cyclobutanediol, 1,4-cyclohexanedimethanol, and terephthalic acid residues), a modifying glycol can be residues of ethylene glycol and/or of isosorbide.

In one TMCD copolyester embodiment, ethylene glycol is excluded as a modifying diol. For modified PETG and modified PCTG polymers, the modifying glycol can be a glycol other than ethylene glycol and 1,4-cyclohexanedimethanol, for example.

The polymers and/or polyesters useful in the invention can comprise residues of 1,4-cyclohexanedimethanol in any amount, included but not limited to at least one of the following amounts: from 0.01 to 100 mole %; from 0.01 to 100 mole %; from 0.01 to 99.99 mole %; from 0.10 to 99 mole %; from 0.10 to 99 mole %; from 0.10 to 95 mole %; from 0.10 to 90 mole %; from 0.10 to 85 mole %; from 0.10 to 80 mole %; from 0.10 to 70 mole %; from 0.10 to 60 mole %; from 0.10 to 50 mole %; from 0.10 to 40 mole %; from 0.10 to 35 mole %; from 0.10 to 30 mole %; from 0.10 to 25 mole %; from 0.10 to 20 mole %; from 0.10 to 15 mole %; from 0.10 to 10 mole %; from 0.10 to 5 mole %; from 1 to 100 mole %; from 1 to 99 mole %; 1 to 95 mole %; from 1 to 90 mole %; from 1 to 85 mole %; from 1 to 80 mole %; from 1 to 70 mole %; from 1 to 60 mole %; from 1 to 50 mole %; from 1 to 40 mole %; from 1 to 35 mole %; from 1 to 30 mole %; from 1 to 25 mole %; from 1 to 20 mole %; from 1 to 15 mole %; from 1 to 10 mole %; from 1 to 5 mole %; 5 to 100 mole %; 5 to 99 mole %; 5 to 95 mole %; from 5 to 90 mole %; from 5 to 85 mole %; from 5 to 80 mole %; 5 to 70 mole %; from 5 to 60 mole %; from 5 to 50 mole %; from 5 to 40 mole %; from 5 to 35 mole %; from 5 to 30 mole %; from 5 to 25 mole %; from 5 to 20 mole %; and from 5 to 15 mole %; from 5 to 10 mole %; from 10 to 100 mole %; from 10 to 99 mole %; 10 to 95 mole %; from 10 to 90 mole %; from 10 to 85 mole %; from 10 to 80 mole %; from 10 to 70 mole %; from 10 to 60 mole %; from 10 to 50 mole %; from 10 to 40 mole %; from 10 to 35 mole %; from 10 to 30 mole %; from 10 to 25 mole %; from 10 to 20 mole %; from 10 to 15 mole %; from 20 to 100 mole %; from 20 to 99 mole %; 20 to 95 mole %; from 20 to 90 mole %; from 20 to 85 mole %; from 20 to 80 mole %; from 20 to 70 mole %; from 20 to 60 mole %; from 20 to 50 mole %; from 20 to 40 mole %; from 20 to 35 mole %; from 20 to 30 mole %; and from 20 to 25 mole %; 30 to 100 mole %; from 30 to 99 mole %; 30 to 95 mole %; from 30 to 90 mole %; from 30 to 85 mole %; from 30 to 80 mole %; from 30 to 70 mole %; from 30 to 60 mole %; from 30 to 50 mole %; from 30 to 40 mole %; from 30 to 35 mole %; 40 to 100 mole %; from 40 to 99 mole %; 40 to 95 mole %; from 40 to 90 mole %; from 40 to 85 mole %; from 40 to 80 mole %; from 40 to 70 mole %; from 40 to 60 mole %; from 40 to 50 mole %; 50 to 100 mole %; from 50 to 99 mole %; 50 to 95 mole %; from 50 to 90 mole %; from 50 to 85 mole %; from 50 to 80 mole %; from 50 to 70 mole %; from 50 to 60 mole %; 60 to 100 mole %; from 60 to 99 mole %; 60 to 95 mole %; from 60 to 90 mole %; from 60 to 85 mole %; from 60 to 80 mole %; from 60 to 70 mole %; 70 to 100 mole %; from 70 to 99 mole %; 70 to 95 mole %; from 70 to 90 mole %; from 70 to 85 mole %; from 70 to 80 mole %; from 60 to 70 mole %; 80 to 100 mole %; from 80 to 99 mole %; 80 to 95 mole %; from 80 to 90 mole %; 90 to 100 mole %; from 90 to 99 mole %; 90 to 95 mole %; 95 to 100 mole %; or from 95 to 99 mole %.

The polymer composition useful in the invention can any of the traditional compositions described as glycol modified PET (PETG), glycol modified poly(cyclohexylene dimethylene terephthalate) (PCTG); and any of the foregoing polymers can also be modified with 2,2,4,4-tetramethylcyclobutane-1,3-diol (TMCD polyesters).

In one aspect, the polyester useful in the polymer compositions of the invention comprises residues of isosorbide. In one embodiment, the isosorbide polymer can also comprise residues of ethylene glycol and/or cyclohexanedimethanol. In certain embodiments, the polyester comprises residues of isosorbide and 1,4-cyclohexanedimethanol and optionally, ethylene glycol. In certain embodiments, the polyester comprises residues of isosorbide and ethylene glycol and optionally, 1,4-cycloehexanedimethanol.

In certain embodiments, the polymer compositions of the invention can include copolyesters comprising 1,4-cyclohexanedimethanol and, optionally, ethylene glycol.

In certain embodiments, the polymer compositions of the invention may can include copolyesters comprising, In certain embodiments, the polymer compositions of the invention may can include copolyesters comprising, optionally, 0.01 to 30 mole %, or 0.01 to 20 mole %, or 0.01 to 10 mole %, or 0.01 to 5 mole % of terephthalic acid and/or isophthalic acid, or esters there and/or mixtures thereof; and a diol component comprising: (a) from 20 to less than 50 mole % of 1,4-cyclohexanedimethanol and residues from greater than 50 to 80 mole % ethylene glycol residues; or from 20 to 40 mole % of 1,4-cyclohexanedimethanol residues and from 60 to 80 mole % ethylene glycol residues, or from 20 to 40 mole % of 1,4-cyclohexanedimethanol residues and from 60 to 80 mole % ethylene glycol residues, or from 25 to 40 mole % of 1,4-cyclohexanedimethanol residues and from 60 to 75 mole % ethylene glycol residues, or from 25 to 35 mole % of 1,4-cyclohexanedimethanol residues and from 65 to 75 mole % ethylene glycol residues (PETG); or (b) from 50 mole % to 99.99 mole %, or from 55 mole % to 99.99 mole %, or from 60 mole % to 99.99 mole %, or from 65 mole % to 99.99 mole %, or from 70 mole % to 99.99 mole %, or from 75 mole % to 99.99 mole %, or from 80 mole % to 99.99 mole %, or from 85 mole % to 99.99 mole % percent, or from 90 mole % from to 99.99 mole %, or 95 mole % to 99.99 mole %, of residues of 1,4-cyclohexanedimethanol and from 0.01 mole % to 50 mole %, or from 0.01 mole % to 45 mole %, or from 0.01 mole % to 40 mole %, or from 0.01 mole % to 35 mole %, or from 0.01 mole % to 30 mole %, or from 0.01 mole % to 25 mole %, or from 0.01 mole % to 20 mole %, or from 0.01 mole % to 15 mole %, or from 0.01 mole % to 10 mole %, or from 0.01 mole % to 5 mole %, of residues of ethylene glycol (PCTG); or (c) from 95 to 99.99 mole %, of residues of 1,4-cyclohexanedimethanol and from 0.01 to 10 mole % or from 0.01 to 5 mole % of residues of isophthalic acid, and from 0.01 to 10 mole % or from 0.01 to 5 mole % of residues of ethylene glycol (PCTA) or (d) 0 to 20 mole % of residues of 1,4-cyclohexanedimethanol and 80 to 100 mole % of residues of ethylene glycol (PET or glycol modified PET), or (e) TMCD copolyesters comprising 20 to 60 mole % residues of TMCD and 40 to 80 mole % residues of 1,4-cyclohexanedimethanol, and 0 to 40 mole % of residues of a modifying glycol; or TMCD copolyesters comprising 15 to 40 mole % residues of TMCD and 60 to 85 mole % residues of 1,4-cyclohexanedimethanol, and 0 to 35 mole % of residues of a modifying glycol; or TMCD copolyesters comprising 20 to 40 mole % residues of TMCD and 60 to 80 mole % residues of 1,4-cyclohexanedimethanol, and 0 to 20 mole % of residues of a modifying glycol; or TMCD copolyesters comprising 20 to 30 mole % residues of TMCD and 70 to 80 mole % residues of 1,4-cyclohexanedimethanol, and 0 to 10 mole % of residues of a modifying glycol; or TMCD copolyesters comprising 30 to 40 mole % residues of TMCD and 60 to 70 mole % residues of 1,4-cyclohexanedimethanol, and 0 to 10 mole % of residues of a modifying glycol; (f) isosorbide polymers comprising ethylene glycol or (g) (PCT as defined herein), or (h) isosorbide polymers comprising 1,4-cyclohexanedimethanol and optionally, ethylene glycol.

Copolyesters useful in the present disclosure can have an inherent viscosity of about 0.4 to about 1.2 dL/g. As used, herein inherent viscosity (or IhV) is the viscosity of a dilute solution of the polymer, specifically IhV is the viscosity of a 60/40 (wt %/wt %) phenol/tetrachloroethane at a concentration of about 0.25 g polyester per 50 ml solution at about 25° C. or about 30° C. as determined by ASTM 4603. This viscosity measurement is representative of the polymer's molecular weight.

For example, in one embodiment, the copolyester has an inherent viscosity of about 0.45 to about 0.9 dL/g or about 0.60 to about 0.90 as measured at about 25° C. using 0.50 grams of polymer per 100 mL of a solvent consisting of 60% by weight of phenol and 40% by weight of tetrachloroethane.

In one embodiment, copolyesters useful in the present disclosure have a glass transition temperature of about 30° C. to about 155° C. For example, in one embodiment, the glass transition temperature of the copolyesters is about 90° C. to about 120° C. In one embodiment, the glass transition temperature of the copolyesters is about 95° C. to about 140°

C. In another embodiment, the glass transition temperature of the copolyesters is about 100° C. to about 150° C. In one embodiment, copolyesters useful in the present disclosure have a glass transition temperature of at least about 90° C. In one embodiment, the copolyesters have a glass transition temperature of at least about 100° C., or at least about 110° C., or at least about 120° C.

The copolyester may be prepared by conventional polycondensation procedures well-known in the art. Such processes include direct condensation of the dicarboxylic acid (s) with the diol(s) or by ester interchange using a dialkyl dicarboxylate. For example, a dialkyl terephthalate such as dimethyl terephthalate is ester interchanged with the diol(s) at elevated temperatures in the presence of a catalyst. The polyesters may also be subjected to solid-state polymerization methods. Suitable methods include the steps of reacting one or more dicarboxylic acids with one or more glycols at a temperature of about 100° C. to about 315° C. at a pressure of about 0.1 to about 760 mm Hg for a time sufficient to form a polyester. See U.S. Pat. No. 3,772,405 for methods of producing polyesters, the disclosure of such methods which is incorporated herein by reference.

The copolyesters suitable for use in the present disclosure may be obtained commercially from Eastman Chemical Company.

Any polycarbonate ("PC") polymer resin is suitable for use in the present disclosure. For example, in one embodiment polycarbonate resins useful in the present disclosure include aromatic polycarbonates. The aromatic polycarbonates suitable for compositions of the present disclosure include, for example, polymers derived from diphenols such as bisphenol A, 1,1(4 hydroxyphenol)ketone, bis-(4-hydroxyphenyl)methane, 1,1-bis-(hydroxyphenyl)-ethane, phenolphthalein, and 1,1 bis(hydroxyphenol) sulfone; and aromatic polycarbonates with alkyl or halogen substituents on the phenyl ring. In another embodiment, the aromatic polycarbonates suitable for compositions of the present disclosure include, for example, polymers derived from diphenols such as the 2,2-Bis(4-hydroxyphenyl)propane (Bisphenol A); 1,1-Bis(4-hydroxyphenyl)-1-phenyl-ethane (Bisphenol AP); 2,2-Bis(4-hydroxyphenyl)hexafluoropropane (Bisphenol AF); 2,2-Bis(4-hydroxyphenyl)butane (Bisphenol B); Bis-(4-hydroxyphenyl)diphenylmethane (Bisphenol BP); 2,2-Bis(3-methyl-4-hydroxyphenyl)propane (Bisphenol C); Bis(4-hydroxyphenyl)-2,2-dichlorethylene (Bisphenol C2); 1,1-Bis(4-hydroxyphenyl)ethane (Bisphenol E); Bis(4-hydroxyphenyl)methane (Bisphenol F); 2,2-Bis(4-hydroxy-3-isopropyl-phenyl)propane (Bisphenol G); 1,3-Bis(2-(4-hydroxyphenyl)-2-propyl)benzene (Bisphenol M); Bis(4-hydroxyphenyl)sulfone (Bisphenol S); 1,4-Bis(2-(4-hydroxyphenyl)-2-propyl)benzene (Bisphenol P); 5,5'-(1-Methylethyliden)-bis[1,1'-(bisphenyl)-2-ol]propane (Bisphenol PH); 1,1-Bis(4-hydroyphenyl)-3,3,5-trimethyl-cyclohexane (Bisphenol TMC); 1,1-Bis(4-hydroxyphenyl)-cyclohexane (Bisphenol Z); 2,2-Bis(4-hydroxy-3-nitrophenyl)propane (Dinitrobisphenol A); and 2,2-Bis(4-hydroxy-3,5-dibromophenyl)propane (Tetrabromobisphenol A).

In one embodiment, the polycarbonates are high molecular weight, thermoplastic aromatic polycarbonates and include homopolycarbonates and copolycarbonates and mixtures thereof which have a number average molecular weight of about 8,000 to more than 200,000, or about 10,000 to 80,000 and an intrinsic viscosity of 0.30 to 1.0 deciliters per gram (dl/g) as measured in solution in methylene chloride at 25° C. The polycarbonates are derived from dihydric phenols such as, for example, 2,2-bis(4-hydroxyphenyl) propane, bis(4-hydroxyphenyl) methane, 2,2-bis(4-hydroxy-3-methylphenyl) propane, 4,4-bis(4-hydroxyphenyl) heptane, 2,2-(3,5,3',5-tetrachloro-4,4'-dihydroxyphenyl) propane, 2,2-(3,5,3'5-tetrabromo-4,4'-dihydroxydiphenyl) propane, and (3,3'-dichloro-4,4'-dihydroxydiphenyl) propane, and (3,3'-dichloro-4,4'-dihydroxydiphenyl) methane. Other dihydric phenols for use in the preparation of the above polycarbonates are disclosed in U.S. Pat. Nos. 2,999,835; 3,028,365; 3,334,154 and 4,134,575 incorporated herein by reference.

In one embodiment, the polycarbonate resin in the present disclosure is a bisphenol-based polycarbonate. In one embodiment, the polycarbonate resin in the present disclosure is a bisphenol A-based polycarbonate. In one embodiment, the polycarbonate resin in the present disclosure is a bisphenol S-based polycarbonate. In one embodiment, the polycarbonate resin in the present disclosure is a bisphenol C-based polycarbonate. In one embodiment, the polycarbonate resin is a bisphenol A-based polycarbonate with a melt flow of from about 3 to about 80 g/10 min at 300° C. and 3.8 kg wt (ASTM).

The polycarbonates can be manufactured by known processes. For example, in one embodiment the polycarbonates can be manufactured, by reacting a dihydric phenol with a carbonate precursor such as phosgene in accordance with methods set forth in the above-cited literature and in U.S. Pat. Nos. 3,989,672; 4,018,750 and 4,123,436, or by transesterification processes such as are disclosed in U.S. Pat. No. 3,153,008, as well as other processes known to those skilled in the art, all of which are incorporated herein by reference.

In one embodiment, the polycarbonates are aromatic polycarbonates and include the polymeric derivatives of a dihydric phenol, a dicarboxylic acid, and carbonic acid, such as are disclosed in U.S. Pat. No. 3,169,121.

In one embodiment, two or more different dihydric phenols or a copolymer of a dihydric phenol with a glycol or acid terminated polyester, or with a dibasic acid in this aspect a carbonate copolymer or interpolymer is used rather than a homopolymer in the preparation of the aromatic polycarbonate. Also employable are blends of any of the above materials.

In one embodiment, branched polycarbonates, such as are described in U.S. Pat. No. 4,001,184, can be utilized, as can blends of linear polycarbonates and branched polycarbonates.

In one embodiment, the polymer is produced by reacting a dihydric phenol, e.g., 2,2-bis(4-hydroxyphenyl)propane, with a carbonate precursor, e.g., phosgene, in the presence of an acid binding agent. In one embodiment, the polycarbonate resins are derived from the reaction of bisphenol-A and phosgene. In one embodiment, these polycarbonates have an intrinsic viscosity between 0.3 and 1.0 dl./g. or from 0.40 to 0.65 dl./g. as measured at 25° C. in methylene chloride or a similar solvent.

Any polyvinyl chloride ("PVC") polymer resin is suitable for use in the present disclosure. For example, in one embodiment polyvinyl chloride polymers useful in the present disclosure include those described in the "Vinyl Chloride Polymers" entry of Kirk-Othmer Encyclopedia of Chemical Technology, Vol. 24, 4th ed., (1997) pp. 1017-1053, which is incorporated herein by reference.

In some embodiments, in the present disclosure, suitable PVC polymers include homopolymers of polyvinyl chloride resin(s), copolymers of polyvinyl chloride resin(s), and mixtures thereof.

In some embodiments, the polyvinylchloride resins are polyvinylchloride resins, chlorinated polyvinylchloride resins, or alloys thereof.

In some embodiments, copolymers of vinyl chloride are formed by the copolymerization of vinyl chloride and other monomers or monomer blends. In some embodiments, suitable monomers include vinyl acetate, ethylene, propylene, maleate, methacrylate, acrylate, high alcohol vinyl ester, urethane, chlorinated urethane, methylmethacrylate, and mixtures thereof. In some embodiments, examples of monomer blends include ethylene-vinyl acetate copolymer, acrylonitrile-butadiene-styrene terpolymer, acrylonitrile-butadiene copolymer, and mixtures thereof.

For example, in some embodiments, PVC polymers useful according to this disclosure include homopolymers of vinyl chloride and those vinyl chloride polymer resins having at least about 70 wt. % repeating units polymerized from a vinyl chloride monomer, or at least about 80 wt. %, or at least about 90 wt. %, or even about 95 wt. % or more of repeating units polymerized from a vinyl chloride monomer.

In some embodiments, the polyvinyl chloride polymer compositions of the present disclosure may comprise repeating units polymerized from a vinyl chloride monomer, and may also include comonomers up to about 30 weight percent of the copolymer from, without limitation, one or more of: the esters of acrylic acid, for example, methyl acrylate, ethyl acrylate, butyl acrylate, octyl acrylate, cyanoethyl acrylate, and the like; vinyl esters such as vinyl acetate and vinyl propionate; esters of methacrylic acid, such as methyl methacrylate, ethyl methacrylate, hydroxyethyl acrylate, butyl methacrylate, and the like; nitriles, such as acrylonitrile and methacrylonitrile; acrylamides, such as methyl acrylamide, N-methylol acrylamide, N-butoxy methacrylamide, and the like; halogen containing vinyl monomers such as vinylidene chloride vinylidene fluoride, and vinyl bromide; vinyl ethers such as ethylvinyl ether, chloroethyl vinyl ether and the like; the vinyl ketones, styrene derivatives including α-methyl styrene, vinyl toluene, chlorostyrene; vinyl naphthalene; olefins such as ethylene, butene, isobutylene, propylene and hexene; and other copolymerizable monomers or mixtures of monomers having suitable reactivity ratios with vinyl chloride as known to those skilled in the art.

In one embodiment, the copolymers can include without limitation vinyl chloride-vinyl acetate copolymers, vinyl chloride-vinylidene chloride copolymers, vinyl chloride maleate and fumarate copolymers, vinyl chloride-olefin copolymers, vinyl chloride-acrylonitrile copolymers, and the like, and combinations thereof.

Some embodiments of the present disclosure may employ PVC blends with crosslinked PVC or crosslinked PVC alone. Crosslinked PVC polymers can be made by polymerizing vinyl chloride in the presence of cross-linking monomers such as the aforementioned diallyl phthalate, trimethylol propane triacrylate, allyl methacrylate, and the like, as taught in U.S. Pat. Nos. 4,755,699 and 5,248,546, the relevant portions of which are incorporated herein by reference.

The described homopolymers and copolymers are commercially available and may be produced by any suitable polymerization method including suspension, dispersion or blending. For example, in one embodiment, polyvinyl chloride polymers prepared using suspension processes are suitable for use in the present disclosure.

In some embodiments, the PVC compositions are rigid. Any rigid PVC compositions are suitable for use in the present disclosure. For example, in some embodiments, the rigid compositions are unmodified or unplasticized or the PVC contains small amounts or no plasticizer. In some embodiments, the rigid compositions contain about 12 phr or less of plasticizers or plasticizing additives. Whereas, flexible or plasticized PVC, typically may include plasticizers at levels greater than about 12 phr. Thus, rigid PVC according to the present disclosure is characterized by a having a higher level of tensile strength than modified PVC compositions that are classified as flexible. As used herein, "parts per hundred parts resin defines the quantity of the components based on the weight of the resin and is abbreviated "phr".

Also, according to the present disclosure, rigid PVC refers to the property of a given compound having more than a certain tensile modulus. For example, PVC may be characterized as rigid when it has a tensile modulus that exceeds about 105 psi (or about 689 MPa), and semirigid when its tensile modulus falls between about 105 psi and about 3000 psi (about 20.7 MPa), and flexible when it has a tensile modulus that is less than about 3000 psi (or about 20.7 MPa) (the tensile modulus values are based on standard ASTM conditions of 23° C. and 50% relative humidity). Therefore, rigid PVC according to the present disclosure may have tensile modulus values that vary over a wide range, for example, the tensile modulus values may be from about 800 MPa to about 1000 MPa, or from about 1000 MPa up to about 2000 MPa or even up to 3000 MPa or greater.

In some the embodiments, the PVC compositions of the present disclosure are suitable for use in a variety of applications including, for example, building and construction, corner profiles, decking, fencing, railings, soffits, vinyl siding, cladding, window profiles, door frames, siding, fences, gutters, pipes, piping, appliances, electrical and electronic enclosures, electrical junction boxes, automobile interiors and exteriors, appliances, office equipment, sign enclosures, medical devices, aircraft interiors, and other high temperature applications.

In some embodiments, the polyvinyl chloride resins compositions contain additives such as processing aids, plasticizers, stabilizers, impact modifiers, biocides, flame retardants, foaming agents, blowing agents, ultraviolet light stabilizers, ultraviolet light absorbers, thermal stabilizers, minerals, pigments, dyes, colorants, fillers, fibers, waxes, fusion promoters, antioxidants, antistatic agents, release agents, lubricants, additional resins, heat distortion temperature modifiers, and possibly other additives. In some embodiments, the amount of polyvinyl chloride in the commercially available rigid polyvinyl chloride resin compositions used are typically is less than about 100%.

Any of the types of PVC resins known in the art can be useful as a component of the compositions of the disclosure. In some embodiments, the PVC resins may be in the form of a plastisol or a dry blend. Further, in some embodiments, the compositions of this disclosure can include virgin PVC, recycled PVC, such as PVC recycled from various roofing products, and combinations of virgin and recycled PVC.

In one embodiment, the PVC resins in this disclosure have inherent viscosities as determined by ASTMD1243 ranging from about 0.50 to about 1.60 dl/g, or more, for example, about 0.65 to about 1.40 dl/g, for example, about 0.83 to about 1.00 dl/g.

In one embodiment, the polyvinyl chloride resins have a Tg from about 75° C. to about 80° C. In one embodiment, the polyvinyl chloride resin has a heat deflection temperature (HDT) from about 60° C. to about 75° C.

In one aspect of the present disclosure, when the Tg of the copolyester is greater than about 90° C., the Tg of the PVC resin composition will increase and the HDT of the composition will improve.

For example, in some embodiment the polyvinyl chloride articles made using the compositions of the present disclosure have a Tg up to 110° C. or a HDT of up to 130° C. while maintaining impact strength. In some embodiments, the articles have an increase in Tg and HDT of at least 3° C. while maintaining impact strength.

In some embodiments, the ratio of PVC resin:copolyester on a weight fraction basis is greater than about 1.

In some embodiments, the ratio of PVC resin:copolyester and polycarbonate on a weight fraction basis is greater than about 1.

In some embodiments, when the polyvinyl chloride resins and copolyesters are added at the appropriate concentrations to produce PVC compositions, and the resulting compositions have increased tensile strength and modulus as determined by ASTM D638 and increased flexural strength and modulus as determined by ASTM D790.

The copolyesters in the present disclosure are miscible in PVC. The term "miscible" refers to blends or admixtures of two or more polymers that are homogenous on molecular level and behave as a single-phase mixture, exhibiting only one glass transition temperature (Tg).

The resulting PVC compositions disclosed herein can be processed on any standard PVC processing equipment, at any standard PVC processing temperatures (about 170° C. to about 230° C.) and using any standard PVC processing methods such as extrusion, injection molding, profile extrusion and sheet extrusion.

In some embodiments, the copolyesters of the present disclosure have Tg from about 75° C. to about 120° C. In some embodiments, the copolyesters of the present disclosure have Tg of at least about 90° C. and higher. In some embodiments, the copolyesters of the present disclosure have Tg of at least about 100° C. and higher. In some embodiments, the copolyesters of the present disclosure have Tg of at least about 110° C. and higher.

The copolyesters used in certain embodiments of the present disclosure, do not have distinct melting points but instead will undergo a decrease in viscosity as the processing temperatures increase past its glass transition temperature. Lower viscosity copolyesters can be obtained by using copolyesters with lower molecular weights.

In one embodiment of the present disclosure, the copolyesters have a viscosity range of about 1,000 to about 1,000,000 poise measured at about 170° C. to about 200° C. and at 10 1/s shear rate, or from about 10,000 to about 500,000 poise or from about 20,000 to about 300,000 poise. The viscosity measurements in this aspect of the disclosure are made by performing small amplitude oscillatory shear (SAOS) experiments using a Rheometrics RDA II rheometer and performing frequency sweeps over the range of 1 to 400 s-1 at multiple temperatures above the Tg as determined by ASTM D4440. In some embodiments, the viscosities are measure at the PVC processing temperatures of about 170° C. to about 230° C.

In one embodiment of the present disclosure, the copolyesters have crystallization half times of greater than about 5 minutes, a glass transition temperature of at least about 90° C. or higher, a viscosity range of about 1,000 to about 1,000,000 poise measured at about 170 to about 230° C. and at 10 1/s shear rate.

In another embodiment of the present disclosure, the copolyester compositions have a crystallization half time of greater than about 5 minutes and a glass transition temperature of at least 100° C. or higher and a viscosity range of about 1,000 to about 1,000,000 poise measured at about 170° C. to about 230° C. and at 10 1/s shear rate.

In some embodiments, the PVC resins are combined with other additives such as processing aids, plasticizers, stabilizers, impact modifiers, biocides, flame retardants, foaming agents, blowing agents, thermal stabilizers, UV stabilizers, UV absorbers, minerals, pigments, dyes, colorants, fillers, fibers, waxes, fusion promoters, antioxidants, antistatic agents, release agents, lubricants, additional resins, heat distortion temperature modifiers and possibly other additives.

One embodiment of the present disclosure is a method of producing a polyvinyl chloride composition comprising: compounding a miscible admixture of at least one polycarbonate resin and at least one copolyester which comprises: (a) a dicarboxylic acid component comprising: (i) about 90 to about 100 mole % of terephthalic acid residues; (ii) about 0 to about 10 mole % of aromatic and/or aliphatic dicarboxylic acid residues having up to 20 carbon atoms; and (b) a glycol component comprising: (i) about 20 to about 60 mole % of a modifying glycol consisting of 2 to 20 carbon atoms and (ii) about 40 to about 80 mole % of a second modifying glycol consisting of 2 to 20 carbon atoms, to produce a viscous thermoplastic material, blending the compound with at least one polyvinyl chloride resin composition; and introducing the blend into a calendering, extrusion or injection molding process to produce polyvinyl chloride articles.

Another embodiment of the present disclosure is a method of producing a polyvinyl chloride composition comprising: compounding at least one polyvinyl chloride resin with at least one copolyester which comprises: (a) a dicarboxylic acid component comprising: (i) about 90 to about 100 mole % of terephthalic acid residues; (ii) about 0 to about 10 mole % of aromatic and/or aliphatic dicarboxylic acid residues having up to 20 carbon atoms; and (b) a glycol component comprising: (i) about 20 to about 60 mole % of a modifying glycol consisting of 2 to 20 carbon atoms and (ii) about 40 to about 80 mole % of a second modifying glycol consisting of 2 to 20 carbon atoms, to produce a viscous thermoplastic material, mixing the compounded composition with a polyvinyl chloride resin to create a polyvinyl chloride composition; extruding the polyvinyl chloride composition through a die to produce pellets; and introducing the pellets into a calendering, extrusion or injection molding process to produce polyvinyl chloride articles.

In some embodiments, the PVC compositions of the present disclosure are used to make articles such as films, sheets, profiles or injection molded articles and parts.

The compositions of this disclosure are useful as molded plastic parts or as solid plastic objects. In some embodiments, the films, sheets, profiles, and injection molded articles and parts can be made using any extrusion process including extrusion processes whereby pellets are either blended together (when using concentrated ingredients) or added directly to an extruder (when using a fully compounded composition). In some embodiments, the films, profiles and sheets can be made using any calendering process.

In some embodiments, melt processing of the compositions of the present disclosure involves extrusion using any equipment known in the art including, without limitation, twin screw extruders, single screw extruders, high intensity batch mixers, Banbury mixers, Brabender mixers, roll mills, ko-kneaders or planetary gear extruder. The shear energy during the mixing is dependent on the combination of equipment, blade design, rotation speed (rpm), and mixing time. The shear energy should be sufficient to disperse the copolyesters throughout the polyvinyl chloride resins.

In some embodiments, the copolyesters, polyvinyl chloride resins and additives can be combined in any order during the process. In one embodiment, the copolyesters are premixed with the polyvinyl chloride resins. In another embodiment, the polyvinyl chloride resins are premixed with the additives and then mixed with the copolyesters.

The disclosure further relates to articles of manufacture comprising the film(s) and/or sheet(s) containing polyvinyl chloride compositions described herein. In embodiments, the films and/or sheets of the present disclosure can be of any thickness which would be apparent to one of ordinary skill in the art.

The disclosure further relates to the molded articles described herein. The methods of forming the polyvinyl chloride compositions into molded articles can include any known methods in the art. Examples of molded articles of the disclosure including but not limited to injection molded articles, and extrusion molded articles. Methods of making molded articles include but are not limited to injection molding, and extrusion.

The compositions of polycarbonates, copolyesters and polyvinyl chloride resins of the present disclosure can be made into pellets using any standard procedure.

For example, the pellets of present disclosure can be made the following ways. In one embodiment, the polycarbonate/copolyester admixture and polyvinyl chloride resins can be incorporated using a twin screw compounding line. The polycarbonate, copolyester and polyvinyl chloride resins are fed separately into the throat of the extruder and melted to produce a viscous thermoplastic material.

In one embodiment, the polycarbonate/copolyester admixture and the polyvinyl chloride resins can be added using loss-in-weight feeders. The rotation of the two screws melts the polycarbonate/copolyester admixture and PVC together. The mixtures are then extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge is then used to separate the pellets from the water.

In one embodiment, the polycarbonate/copolyester admixture and PVC can be incorporated using as a two-rotor continuous compounding mixer (such as a Farrell Continuous Mixer). The polycarbonate/copolyester admixture can be fed into the throat of the mixer along with the PVC and melted to produce a viscous thermoplastic material. The copolyesters can be pre-blended with the polycarbonate and then added to PVC and this mixture is added to the extruder with a loss-in-weight feeder. The output rate of the mixer is controlled by varying the area of a discharge orifice. The melt can be sliced off into 'loaves' and fed to a two-roll mill or the throat of a single screw extruder. In the case of the melt being fed to a two-roll mill, the melt covers one of the rolls and strip can be fed to the throat of a single screw extruder. The mixture is then extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water. In the case of the 'loaves' being fed to a single screw extruder, the mixture is extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water.

In some embodiments, the polycarbonate/copolyester admixture and PVC resins can be incorporated in a plastics compounding line such as a Banbury batch type mixer. In these embodiments, the polycarbonate/copolyester admixture are pre-blended and this admixture is mixed with the PVC and then fed into the Banbury-type high-intensity mixer and a ram lowered to compress the mixture into the mixing chamber. Two rotating mixer blades melt the pellets and melt the admixture of copolyester and polycarbonate with the PVC. When the desired temperature is reached, a door is opened in the bottom of the mixer and the mixture is dropped to a two-roll mill. A ribbon from the two-roll mill can then be fed to a single screw extruder. The mixture is then extruded through a die to produce multiple strands. The strands can be fed through a water trough to cool the strands. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water.

The present disclosure envisions several different methods to make plastic articles: extrusion to produce a continuous flat sheet or profile, injection molding to create discrete articles or extrusion to produce a continuous film or sheet.

Another embodiment of the disclosure consists of combining a copolyester/polycarbonate admixture with a PVC resin composition to produce a flat sheet or profile using an extrusion process. In some embodiments, this can be accomplished several ways, for example, the copolyester/polycarbonate admixture and the PVC resin composition are added separately to the throat of a single or twin-screw extruder. In another embodiment, an admixture the copolyester and polycarbonate is compounded with the PVC resin composition and then added to the throat of a single or twin-screw extruder. The compounded mixture in some embodiments is conveyed and compressed by the screw(s) down the extruder barrel to melt the mixture and discharge the melt from the end of the extruder. The melt can then be fed through a die to create a continuous flat sheet or an into a profile die to create a continuous shape. In the embodiments using the flat sheet die, the melt is extruded onto a series of metal rolls, typically three, to cool the melt and impart a finish onto the sheet. The flat sheet is then conveyed in a continuous sheet to cool the sheet. It can then be trimmed to the desired width and then either rolled up into a roll or sheared or sawed into sheet form. A flat sheet can also be formed into a shape through mechanical means to form a desired shape and then cooled either by spraying with water, through a water trough or by blowing air on the profile. It can then be sawed or sheared to the desired length.

In embodiments using a profile die, the die is designed to produce the desired shape of the article. After exiting the die, it can then be cooled either by spraying with water, through a water trough or by blowing air on the profile. It can then be sawed or sheared to the desired length.

Another embodiment of the disclosure consists of combining a copolyester/polycarbonate admixture with a PVC resin composition to produce an injection molded article. This can be accomplished several ways by separately adding the copolyester/polycarbonate blend, as described above, and the PVC resin to the throat of a single or twin-screw extruder. In another embodiment, an admixture of the copolyester and polycarbonate is mixed with the PVC composition and are then added to the throat of a single or twin-screw extruder. The blended mixture, in some embodiments, is conveyed and compressed by the screw(s) down the extruder barrel to melt the mixture and discharge the melt from the end of the extruder. When the pellets reach the desired temperature, a gate is opened at the end of the extruder and the melted plastic is pumped by the screw into a heated mold to form an article of the desired shape. After the mold is filled, a coolant is pumped through the mold to cool it and the melted plastic. After the plastic has solidified, the mold is opened, and the article is removed from the mold.

For example, one embodiment of the present disclosure is a method of producing a polyvinyl chloride composition comprising: extruding at least one polyvinyl chloride resin composition and at least one copolyester/polycarbonate admixture, as described above, to produce a viscous blend of thermoplastic material, introducing the blend of thermoplastic material into a calendaring, extrusion or injection molding process to produce polyvinyl chloride articles.

Another embodiment of the present disclosure is a method of producing a polyvinyl chloride composition comprising: compounding a miscible blended mixture of at least one polyvinyl chloride resin composition and at least one copolyester/polycarbonate admixture, as described above, to produce a viscous thermoplastic material, extruding the compound through a die to produce pellets; and introducing the pellets into a calendering, extrusion or injection molding process to produce polyvinyl chloride articles. In some embodiments, the polyvinyl chloride compositions are rigid.

Useful applications for these PVC compositions can include many building and construction applications such as corner profiles, decking, fencing, railings, window profiles and other interior and exterior applications.

Other applications for these PVC compositions can include uses in appliances, electrical and electronic enclosures, sign enclosures, automotive applications, aircraft interiors, and other applications where rigid PVC formulations have been limited due to their lower tensile strength and modulus and flexural strength and modulus.

For example, in some embodiments, the PVC articles of this disclosure are used in the following applications: building and construction, corner profiles, decking, fencing, railings, soffits, vinyl siding, cladding, window profiles, door frames, siding, fences, gutters, pipes, piping, electrical and electronic enclosures, electrical junction boxes, automobile interiors and exteriors, appliances, office equipment, sign enclosures, medical devices, aircraft interiors, and other applications. In some embodiments, the polyvinyl chloride articles are rigid.

This disclosure can be further illustrated by the following examples, although it will be understood that these examples are included merely for purposes of illustration and are not intended to limit the scope of the disclosure unless otherwise specifically indicated.

EXAMPLES

The following tables and figures summarize experimental results of the disclosure and comparative examples:

Examples

TABLE 1

Base Rigid PVC Formulation
Base Formulation/Control

| Ingredient | Supplier | Description | PHR |
| --- | --- | --- | --- |
| PVC Resin OXY 185F | OXY Chem | Suspension Grade PVC Resin, .67 Inherent Viscosity | 100 |
| Impact Modifier Kane Ace B564 | Kaneka | Methylmethacrylate Butadiene Styrene Copolymer Core/Shell Impact Modifier | 8 |
| Akrostab T-5003B | Valtris | Butyl Tin high efficiency thermal stabilizer | 3 |
| Acrylic Process Aid Paraloid K-125 | Dow Chemical | General Purpose, All acrylic processing aid | 3 |
| AC-316 A | Honeywell | Oxidized Polyethylene | 1 |
| External Lubricant - Stearic Acid Hystrene 5016NF | PMC Biogenix | Triple pressed Stearic Acid | 0.2 |
| Internal Lubricant - V Wax E | Strucktol | Natural non-hydrogenated wax with long chain esters and branched natural acids | 0.2 |

Table 1 is the control formulation used in all of the examples. All data generated used the control formula and additives were incorporated at various part per hundred resin levels based on 100 parts of PVC resin. All samples were melted and prepared using by mixing 280 grams of compound in a Brabender Intelli-Torque mixer set at 190° C. at 30 rpm blade speed. Samples were removed from the Brabender at 190° C. and transferred to a Dr. Collin Two Roll Mill. The front roll temperature was set at 180° C. and the back roll temperature was set at 175° C. The melted material was placed on the mill, the roll speed was set at 20 rpm. The temperature of the material reached 175 C then removed from the mill. Films were taken off the mill at 0.010" (250 microns) and allowed to cool.

TABLE 2

Copolyester/Polycarbonate mixture descriptions

| Additive | Composition |
| --- | --- |
| HDT 1 | Amorphous Copolyester |
| HDT 2 | 50% Amorphous Copolyester/50% Makrolon 2608 |
| HDT 3 | 25% Amorphous Copolyester/75% Makrolon 2608 |

Table 2 summarizes the sample compositions. Sample compositions were created by blending the control formulation in Table 1 with varying amounts of HDT 1, HDT 2 and HDT 3 as described to create admixtures with various amounts of polycarbonate from 0% to approximately 31% by weight.

The amorphous copolyester is commercially available from Eastman Chemical Company and has a glass transition temperature of around 116° C. The polycarbonate, Makrolon 2608, is a medium viscosity, amorphous bis-phenol A polycarbonate resin made by Covestro with a glass transition temperature of around 148° C.

Polycarbonate, Makrolon 2658 is a medium viscosity, amorphous bis-phenol A polycarbonate resin made by Covestro with a glass transition temperature of around 148° C. was also used in some examples.

Example 1: DSC and HDT

Samples were prepared adding HDT 1, HDT 2 and HDT 3 at 30, 40, 50, 60 and 80 phr. Additional samples were prepared by adding mixtures of HDT 2 and HDT 3 at ratios of 50/10, 30/30 and 10/50 (total of 60 phr) and mixtures of HDT 2 and HDT 3 at 65/15, 40/40, and 15/65 (total of 80 phr). Table 3 contains Differential Scanning Calorimetry (DSC) (ASTM D3418) and Heat Distortion Temperature Under Load (HDTUL) (ASTM D1637) results at 1 and 2% strain. The data shows that the $T_g$ as determined by DSC of all compositions containing HDT 1, HDT 2 and HDT 3 and mixtures of HDT2 and HDT 3 were higher than the control sample. The $T_g$ value as determined by DSC was taken at the midpoint of the glassy transition region. The data also shows that the HDTUL as determined by tensile DMA at 1 and 2% strain was higher than the control formulation.

TABLE 3

DSC (ASTM D3418) and HDTUL (ASTM D1637)

| Sample ID | Sample | PHR | % Polycarbonate | DSC Data $T_g$ (° C.) | DMTA Q-800 HDT Temperature at 1% Strain (° C.) | DMTA Q-800 HDT Temperature at 2% Strain (° C.) |
|---|---|---|---|---|---|---|
| 1 | Control | — | 0.0 | 75.21 | 66.20 | 73.17 |
| 2 | HDT1 30 PHR | 30 | 0.0 | 82.71 | 77.50 | 83.00 |
| 3 | HDT1 40 PHR | 40 | 0.0 | 84.69 | 73.50 | 80.30 |
| 4 | HDT1 50 PHR | 50 | 0.0 | 88.10 | 76.80 | 83.70 |
| 5 | HDT2 30 PHR | 30 | 10.4 | 80.51 | 73.10 | 79.10 |
| 6 | HDT2 40 PHR | 40 | 12.9 | 81.80 | 77.40 | 83.90 |
| 7 | HDT2 50 PHR | 50 | 15.2 | 84.10 | 74.10 | 81.90 |
| 8 | HDT3 30 PHR | 30 | 15.5 | 80.12 | 77.90 | 81.90 |
| 9 | HDT3 40 PHR | 40 | 19.4 | 80.64 | 73.90 | 80.30 |
| 10 | HDT3 50 PHR | 50 | 22.8 | 82.32 | 74.90 | 80.90 |
| 21 | HDT1 | 60 | 0.0 | 87.13 | 69.31 | 77.98 |
| 22 | HDT2 | 60 | 17.1 | 82.96 | 71.38 | 79.39 |
| 23 | HDT3 | 60 | 25.7 | 81.69 | 76.38 | 81.65 |
| 24 | HDT2/HDT3 | 50/10 | 18.3 | 83.16 | 76.46 | 81.47 |
| 25 | HDT2/HDT3 | 30/30 | 21.4 | 83.44 | 70.47 | 78.78 |
| 26 | HDT2/HDT3 | 10/50 | 24.2 | 82.33 | 70.40 | 78.62 |
| 27 | HDT1 | 80 | 0.0 | 89.74 | 78.32 | 83.59 |
| 28 | HDT2 | 80 | 20.5 | 84.84 | 72.86 | 81.11 |
| 29 | HDT3 | 80 | 30.7 | 84.84 | 76.58 | 80.53 |
| 30 | HDT2/HDT3 | 65/15 | 22.4 | 84.57 | 70.21 | 78.97 |
| 31 | HDT2/HDT3 | 40/40 | 25.6 | 83.78 | 74.22 | 81.58 |
| 32 | HDT2/HDT3 | 15/60 | 28.8 | 83.28 | 78.84 | 83.07 |

Example 2: Impact Properties

Samples were prepared adding HDT 1, HDT 2 and HDT 3 at 30, 40, 50, 60 and 80 phr. Additional samples were prepared by adding mixtures of HDT 2 and HDT 3 at ratios of 50/10, 30/30 and 10/50 (total of 60 phr) and mixtures of HDT 2 and HDT 3 at 65/15, 40/40, and 15/65 (total of 80 phr). Table 4 is a summary of the Instrumented Impact (ASTM D 3763) results. The data shows that all compositions containing HDT 1 alone were ductile as determined by visual inspection of the impacted samples. The data shows that compositions that contain polycarbonate, Makrolon 2608, exhibit mostly ductile impact properties up to approximately 15% loading by weight as determined by visual inspection of the impacted samples. The data also shows, that while brittle, significant loss of impact strength as measured by Average Max Load (kN), Average Energy at Max Load (J), Average Puncture Energy (J) and Average Total Energy (J) was not seen until the polycarbonate content, Makrolon 2608, was about 25%.

TABLE 4

Instrumented Impact Results (ASTM D-3763)

| | Sample Information | | | Instrumented Impact Data (Normalized by thickness) | | | | |
|---|---|---|---|---|---|---|---|---|
| | | | % | Average Max Load | Average Energy at Max Load | Average Puncture Energy | Average Total Energy | Brittle |
| Sample ID | Sample | PHR | Polycarbonate | (kN) | (J) | (J) | (J) | (%) |
| 1 | Control | — | 0.0 | 0.43 | 2.57 | 2.96 | 2.98 | 0.00 |
| 2 | HDT1 30 PHR | 30 | 0.0 | 0.46 | 2.85 | 3.39 | 3.42 | 0.00 |
| 3 | HDT1 40 PHR | 40 | 0.0 | 0.57 | 3.69 | 4.33 | 4.35 | 0.00 |
| 4 | HDT1 50 PHR | 50 | 0.0 | 0.43 | 2.48 | 2.86 | 2.88 | 0.00 |
| 5 | HDT2 30 PHR | 30 | 10.4 | 0.39 | 2.29 | 2.69 | 2.72 | 0.00 |
| 6 | HDT2 40 PHR | 40 | 12.9 | 0.46 | 2.60 | 3.04 | 3.09 | 0.00 |
| 7 | HDT2 50 PHR | 50 | 15.2 | 0.36 | 1.71 | 2.05 | 2.10 | 50.00 |
| 8 | HDT3 30 PHR | 30 | 15.5 | 0.53 | 2.69 | 3.25 | 3.19 | 75.00 |
| 9 | HDT3 40 PHR | 40 | 19.4 | 0.41 | 1.58 | 1.70 | 1.56 | 100.00 |
| 10 | HDT3 50 PHR | 50 | 22.8 | 0.38 | 1.58 | 1.79 | 1.78 | 100.00 |
| 21 | HDT1 | 60 | 0.0 | 0.44 | 2.89 | 3.10 | 3.18 | 0.00 |
| 22 | HDT2 | 60 | 17.1 | 0.29 | 1.16 | 1.26 | 1.35 | 100.00 |
| 23 | HDT3 | 60 | 25.7 | 0.10 | 0.17 | 0.18 | 0.00 | 100.00 |
| 24 | HDT2/HDT3 | 50/10 | 18.3 | 0.37 | 1.69 | 1.80 | 1.81 | 100.00 |
| 25 | HDT2/HDT3 | 30/30 | 21.4 | 0.24 | 0.73 | 0.78 | 0.78 | 100.00 |
| 26 | HDT2/HDT3 | 10/50 | 24.2 | 0.14 | 0.31 | 0.33 | 0.00 | 100.00 |
| 27 | HDT1 | 80 | 0.0 | 0.43 | 2.49 | 2.80 | 2.97 | 0.00 |
| 28 | HDT2 | 80 | 20.5 | 0.32 | 1.26 | 1.30 | 1.32 | 100.00 |
| 29 | HDT3 | 80 | 30.7 | 0.12 | 0.25 | 0.26 | 0.10 | 100.00 |
| 30 | HDT2/HDT3 | 65/15 | 22.4 | 0.15 | 0.45 | 0.46 | 0.36 | 100.00 |
| 31 | HDT2/HDT3 | 40/40 | 25.6 | 0.25 | 0.83 | 0.85 | 0.86 | 100.00 |
| 32 | HDT2/HDT3 | 15/60 | 28.8 | 0.10 | 0.28 | 0.29 | 0.43 | 100.00 |

Example 3: Tensile Properties

Samples were prepared adding HDT 1, HDT 2 and HDT 3 at 30, 40, 50, 60 and 80 phr. Additional samples were prepared by adding mixtures of HDT 2 and HDT 3 at ratios of 50/10, 30/30 and 10/50 (total of 60 phr) and mixtures of HDT 2 and HDT 3 at 65/15, 40/40, and 15/65 (total of 80 phr). Table 5 summarizes the Tensile Property data (ASTM D-638). Measurements were performed in the direction the films were pulled off the two-roll mil (machine direction) and perpendicular to the direction the films were pulled off the mill (transverse direction). Using % strain at break as a proxy for impact strength, the data in the machine and transverse directions generally mirrors the instrumented impact data and complete embrittlement was not seen until the polycarbonate content, Makrolon 2608, was around 25%.

TABLE 5

Tensile Properties (ASTM D-638)

| | Sample Information | | | Tensile Data (MD) | | | | | Tensile Data (TD) | | | | |
|---|---|---|---|---|---|---|---|---|---|---|---|---|---|
| | | | % Polycarbonate | Mean Yield Stress (Mpa) | Mean Yield Strain (%) | Mean Break Stress (Mpa) | Mean Break Strain (%) | Mean Youngs Modulus (Mpa) | Mean Yield Stress (Mpa) | Mean Yield Strain (%) | Mean Break Stress (Mpa) | Mean Break Strain (%) | Mean Youngs Modulus (Mpa) |
| Sample ID | Sample | PHR | | | | | | | | | | | |
| 1 | Control | — | 0.0 | 45.47 | 4.05 | 45.12 | 184.72 | 1938.08 | 43.99 | 4.25 | 36.98 | 121.35 | 1837.23 |
| 2 | HDT1 30 PHR | 30 | 0.0 | 45.48 | 5.36 | 55.05 | 202.49 | 1692.87 | 42.84 | 6.04 | 40.58 | 149.95 | 1514.62 |
| 3 | HDT1 40 PHR | 40 | 0.0 | 45.19 | 5.55 | 52.73 | 216.25 | 1613.65 | 44.14 | 6.21 | 42.09 | 145.45 | 1504.44 |
| 4 | HDT1 50 PHR | 50 | 0.0 | 45.15 | 6.13 | 52.12 | 179.93 | 1563.64 | 43.74 | 5.71 | 40.45 | 116.92 | 1596.87 |
| 5 | HDT2 30 PHR | 30 | 10.4 | 42.75 | 5.08 | 44.71 | 149.72 | 1576.97 | 46.73 | 4.98 | 36.21 | 88.72 | 1780.15 |
| 6 | HDT2 40 PHR | 40 | 12.9 | 47.57 | 4.90 | 46.63 | 167.14 | 1746.15 | 46.74 | 5.28 | 36.60 | 63.09 | 1686.31 |
| 7 | HDT2 50 PHR | 50 | 15.2 | 47.13 | 4.94 | 36.73 | 79.74 | 1695.85 | 48.72 | 4.91 | 36.13 | 32.81 | 1750.77 |
| 8 | HDT3 30 PHR | 30 | 15.5 | 48.21 | 5.21 | 36.09 | 89.75 | 1705.27 | 47.14 | 5.38 | 38.25 | 21.92 | 1662.37 |
| 9 | HDT3 40 PHR | 40 | 19.4 | 49.07 | 5.50 | 44.66 | 10.23 | 1664.97 | 48.28 | 5.45 | 41.20 | 13.56 | 1688.66 |
| 10 | HDT3 50 PHR | 50 | 22.8 | 50.16 | 5.41 | 39.13 | 72.78 | 1719.89 | 49.71 | 5.42 | 38.46 | 24.36 | 1671.05 |
| 21 | HDT1 | 60 | 0.0 | 41.79 | 4.62 | 47.05 | 168.38 | 1684.73 | 43.00 | 5.17 | 40.09 | 119.07 | 1670.56 |
| 22 | HDT2 | 60 | 17.1 | 47.32 | 4.14 | 41.13 | 79.74 | 1987.94 | 42.00 | 4.11 | 42.00 | 4.11 | 1723.06 |
| 23 | HDT3 | 60 | 25.7 | 48.79 | 4.53 | 38.53 | 16.64 | 1964.73 | 48.91 | 4.84 | 48.91 | 4.88 | 1823.33 |
| 24 | HDT2/HDT3 | 50/10 | 18.3 | 47.42 | 3.83 | 43.13 | 89.00 | 1991.70 | 46.98 | 4.72 | 40.87 | 12.32 | 1843.18 |
| 25 | HDT2/HDT3 | 30/30 | 21.4 | 50.16 | 4.45 | 38.43 | 34.24 | 1963.81 | 47.88 | 4.80 | 40.33 | 13.81 | 1812.20 |
| 26 | HDT2/HDT3 | 10/50 | 24.2 | 48.48 | 4.42 | 37.97 | 40.69 | 1984.13 | 47.79 | 4.67 | 47.79 | 4.67 | 1868.71 |
| 27 | HDT1 | 80 | 0.0 | 47.72 | 4.37 | 49.78 | 129.44 | 1856.25 | 42.18 | 5.82 | 38.03 | 104.29 | 1501.32 |
| 28 | HDT2 | 80 | 20.5 | 49.32 | 5.00 | 40.82 | 37.44 | 1852.84 | 47.56 | 5.35 | 44.14 | 9.38 | 1655.14 |
| 29 | HDT3 | 80 | 30.7 | 47.51 | 4.38 | 40.88 | 7.48 | 1795.77 | 49.88 | 5.48 | 49.88 | 5.48 | 1683.73 |
| 30 | HDT2/HDT3 | 65/15 | 22.4 | 50.80 | 4.69 | 41.60 | 11.36 | 1919.76 | 48.50 | 5.42 | 47.46 | 6.29 | 1631.74 |

TABLE 5-continued

Tensile Properties (ASTM D-638)

| | | | | Tensile Data (MD) | | | | | Tensile Data (TD) | | | | |
|---|---|---|---|---|---|---|---|---|---|---|---|---|---|
| Sample Information | | | % Polycar- | Mean Yield Stress | Mean Yield Strain | Mean Break Stress | Mean Break Strain | Mean Youngs Modulus | Mean Yield Stress | Mean Yield Strain | Mean Break Stress | Mean Break Strain | Mean Youngs Modulus |
| Sample ID | Sample | PHR | bonate | (Mpa) | (%) | (Mpa) | (%) | (Mpa) | (Mpa) | (%) | (Mpa) | (%) | (Mpa) |
| 31 | HDT2/HDT3 | 40/40 | 25.6 | 52.07 | 5.25 | 40.01 | 46.02 | 1871.46 | 49.28 | 5.54 | 48.93 | 6.24 | 1678.03 |
| 32 | HDT2/HDT3 | 15/60 | 28.8 | 50.28 | 4.61 | 42.43 | 9.24 | 1886.49 | 49.30 | 5.48 | 49.30 | 5.48 | 1715.63 |

Example 4: Processing Properties

Samples were prepared adding HDT 1, HDT 2 and HDT 3 at 80 phr. Additional samples were prepared by adding mixtures of HDT 2 and HDT 3 at 65/15, 40/40, and 15/65 (total of 80 phr). Additional samples were prepared adding the amorphous copolyester at 20, 40, 60, 80 and 100 phr. FIGS. 1 and 2 contain viscosity data versus shear rate at 190° C. as determined by parallel plate rheometry. The data shows that formulations containing the polycarbonate tend to have a lower melt viscosity than the formulation that contain the PVC and amorphous copolyester.

Example 5. Glass Transition Temperature and Miscibility

Samples were prepared by adding HDT 2 and HDT 3 at 30, 40, 50 phr to the control formulation. FIGS. 3 and 4 show Storage Modulus and Tan Delta charts for HDT 2 added at 30, 40 and 50 phr. FIGS. 5 and 6 show Storage Modulus and Tan Delta charts for HDT 3 added at 30, 40 and 50 phr. All of the charts show a single, unitary glass transition temperatures for all mixtures. The Storage Modulus charts show a single rapid downward slope starting at approximately 90 to 95° C. and ending at approximately 100° C. The Tan Delta Charts show single peaks ranging from around 95 to 100° C.

These data indicate a single miscible admixture of polymers as immiscible polymer admixtures would be expected to have two or more distinct glass transition temperatures.

Comparative Example 1: Tensile Properties, Impact Properties and Compatibility of Polycarbonate at 20, 40 and 60 phr Samples were prepared adding polycarbonate, Makrolon 2658, at 20, 40 and 60 phr to the PVC control formulation. Table 6 summarizes the tensile property data and instrumented impact data. FIG. 7 contains Dynamic Mechanical Analysis (DMA) data. The polycarbonate, Makrolon 2658, has a $T_g$ of ~145° C., and polycarbonates are generally known for being tough polymers. The data in Table 6 shows that all levels of polycarbonate, Makrolon 2658, tested show poor impact properties by lower % Strain at break and brittle instrumented impact properties. FIG. 7 shows that the blends of the polycarbonate, Makrolon 2658, with the PVC control formulation are immiscible as demonstrated by two distinct glass transition temperatures ($T_g$) as determined by the Tan Delta peaks. This data shows that merely incorporating a high $T_g$ thermoplastic material into rigid PVC is not sufficient to increase the $T_g$ and HDTUL and maintain the impact properties of the blend. The high $T_g$ thermoplastic material must also be miscible and compatible.

TABLE 6

Tensile Properties (ASTM-628) and Instrumented Impact (ASTM D3763)

| | Machine Direction | | | | | Transverse Direction | | | | | Impact Data | | | |
|---|---|---|---|---|---|---|---|---|---|---|---|---|---|---|
| | | | | | | | | | | | Average | | | |
| Compositions | Mean Yield Stress (Mpa) | Mean Yield Strain (%) | Mean Break Stress (Mpa) | Mean Break Strain (%) | Mean Youngs Modulus (Mpa) | Mean Yield Stress (Mpa) | Mean Yield Strain (%) | Mean Break Stress (Mpa) | Mean Break Strain (%) | Mean Youngs Modulus (Mpa) | Average Max Load (kN) | Energy at Max Load (J) | Average Total Energy (J) | Brittle (%) |
| 20 PHR PC 2658 | 45.478 | 6.309 | 39.181 | 87.150 | 1710.726 | 43.450 | 5.782 | 35.382 | 53.395 | 1660.105 | 0.57 | 3.19 | 3.50 | 80.0 |
| 40 PHR PC 2658 | 48.327 | 6.775 | 40.652 | 66.396 | 1704.889 | 45.842 | 6.039 | 37.782 | 33.446 | 1664.970 | 0.58 | 3.16 | 3.38 | 100.0 |
| 60 PHR PC 2658 | 49.551 | 7.201 | 43.643 | 73.641 | 1664.864 | 47.654 | 6.531 | 39.790 | 32.449 | 1594.900 | 0.50 | 2.29 | 2.42 | 100.0 |

The invention claimed is:

1. A three component resin composition comprising:
a polyvinyl chloride formulation comprising 100 parts by weight of at least one polyvinyl chloride resin and optional additive quantities of one or more additives, as a first resin component;
about 1 to about 50 parts per hundred resin, based on the polyvinyl chloride resin content in the composition, of at least one polycarbonate resin, as a second resin component; and
about 1 to about 100 parts per hundred resin, based on the polyvinyl chloride resin content in the composition, of at least one amorphous copolyester resin or a copolyester resin blend containing the at least one amorphous copolyester resin, as a third resin component;
wherein the at least one polycarbonate resin comprises at least one bisphenol A based polycarbonate resin;
wherein the copolyester resin blend comprises the at least one amorphous copolyester resin blended with one or more additional polyester resin and/or copolyester resin, so long as the copolyester resin blend has a minimum crystallization half-time of at least about 5 minutes; and
wherein the at least one amorphous copolyester resin is prepared by reacting:
(a) a dicarboxylic acid component comprising:
(i) about 90 to about 100 mole %, based on a total 100 mole % of (a), of terephthalic acid, and
(ii) about 0 to about 10 mole %, based on a total 100 mole % of (a), of aromatic and/or aliphatic dicarboxylic acid having up to 20 carbon atoms; and
(b) a glycol component comprising:
(i) about 20 to about 60 mole %, based on a total 100 mole % of (b), of a first glycol having 2 to 20 carbon atoms, and
(ii) about 40 to about 80 mole %, based on a total 100 mole % of (b), of a second glycol having 2 to 20 carbon atoms.

2. The composition of claim 1, wherein the first glycol is present in the amount of 20 to 40 mole % and the second glycol is present in the amount of 40 to 60 mole %, based on a total 100 mole % of (b).

3. The composition of claim 1, wherein said first glycol is 1,4-cyclohexanedimethanol and said second glycol is ethylene glycol.

4. The composition of claim 1, wherein said first glycol is 2,2,4,4-tetramethyl-1,3-cyclobutanediol, and the second glycol is 1,4-cyclohexanedimethanol.

5. The composition of claim 1, wherein the inherent viscosity of the at least one amorphous copolyester resin is from about 0.50 to about 0.80 dL/g as determined in 60/40 (wt/wt) phenol/tetrachloroethane at a concentration of 0.25 g/50 ml at 25° C.

6. The composition of claim 1, wherein the $T_g$ of the at least one amorphous copolyester resin is at least about 90° C. or higher.

7. The composition of claim 1, wherein the $T_g$ of the at least one amorphous copolyester resin is at least about 100° C. or higher.

8. The composition of claim 1, wherein the at least one amorphous copolyester resin is not present as part of a copolyester resin blend.

9. The composition of claim 1, wherein the at least one amorphous copolyester resin has a viscosity range of about 1,000 to about 1,000,000 poise measured at about 170 to about 230° C. and at 10 1/s shear rate.

10. The composition of claim 1, wherein the at least one polyvinyl chloride resin is a polyvinyl chloride resin, a chlorinated polyvinyl chloride resin, or alloys thereof.

11. The composition of claim 1, wherein the one or more additives are selected from the group consisting of processing aids, plasticizers, stabilizers, impact modifiers, biocides, flame retardants, foaming agents, blowing agents, thermal stabilizers, UV stabilizers, UV absorbers, minerals, pigments, dyes, colorants, fillers, fibers, waxes, fusion promoters, antioxidants, antistatic agents, release agents, lubricants, additional resins, and heat distortion temperature modifiers.

12. The composition of claim 1, wherein the weight ratio of the at least one polyvinyl chloride resin to the third component is greater than about 1.

13. The composition of claim 1, wherein the weight ratio of the at least one polyvinyl chloride resin to the combined weight of the second resin component and the third resin component is greater than about 1.

14. A method of producing an article comprising:
compounding a miscible admixture of at least one polycarbonate resin and at least one amorphous copolyester resin or a copolyester resin blend containing the at least one amorphous copolyester resin to produce a viscous thermoplastic material;
blending the viscous thermoplastic material with a polyvinyl chloride formulation to produce a three component resin composition comprising: the polyvinyl chloride formulation comprising 100 parts by weight of at least one polyvinyl chloride resin and optional additive quantities of one or more additives, as a first resin component; about 1 to about 50 parts per hundred resin, based on the polyvinyl chloride resin content in the composition, of the at least one polycarbonate resin, as a second resin component; and about 1 to about 100 parts per hundred resin, based on the polyvinyl chloride resin content in the composition, of the at least one amorphous copolyester resin or copolyester resin blend containing the at least one amorphous copolyester resin, as a third resin component; and
introducing the three component resin composition to a calendering process, an extrusion process or an injection molding process to produce the article;
wherein the at least one polycarbonate resin comprises at least one bisphenol A based polycarbonate resin;
wherein the copolyester resin blend comprises the at least one amorphous copolyester resin blended with one or more additional polyester resin and/or copolyester resin, so long as the copolyester resin blend has a minimum crystallization half-time of at least about 5 minutes; and
wherein the at least one amorphous copolyester resin is prepared by reacting:
(a) a dicarboxylic acid component comprising:
(i) about 90 to about 100 mole %, based on a total 100 mole % of (a), of terephthalic acid, and
(ii) about 0 to about 10 mole %, based on a total 100 mole % of (a), of aromatic and/or aliphatic dicarboxylic acid having up to 20 carbon atoms; and
(b) a glycol component comprising:
(i) about 20 to about 60 mole %, based on a total 100 mole % of (b), of a first glycol having 2 to 20 carbon atoms, and
(ii) about 40 to about 80 mole %, based on a total 100 mole % of (b), of a second glycol having 2 to 20 carbon atoms.

15. The method of claim 14, wherein the first glycol is present in the amount of 20 to 40 mole % and the second glycol is present in the amount of 40 to 60 mole %, based on a total 100 mole % of (b).

16. The method of claim 14, wherein said first glycol is 1,4-cyclohexanedimethanol and said second glycol is ethylene glycol.

17. The method of claim 14, wherein said first glycol is 2,2,4,4-tetramethyl-1,3-cyclobutanediol, and the second glycol is 1,4-cyclohexanedimethanol.

18. The method of claim 14, wherein said first glycol is 1,4-cyclohexanedimethanol and said second glycol is 2,2,4,4-tetramethyl-1,3-cyclobutanediol.

19. The method of claim 14, wherein the inherent viscosity of the at least one amorphous copolyester resin is from about 0.50 to about 0.80 dL/g as determined in 60/40 (wt/wt) phenol/tetrachloroethane at a concentration of 0.25 g/50 ml at 25° C.

20. The method of claim 14, wherein the $T_g$ of the at least one amorphous copolyester resin is at least about 90° C. or higher or wherein the $T_g$ of the at least one amorphous copolyester resin is at least about 100° C. or higher.

21. The method of claim 14, wherein the at least one amorphous copolyester resin is not present as part of a copolyester resin blend.

22. The the method of claim 14, wherein the one or more additives are selected from the group consisting of processing aids, plasticizers, stabilizers, impact modifiers, biocides, flame retardants, foaming agents, blowing agents, thermal stabilizers, UV stabilizers, UV absorbers, minerals, pigments, dyes, colorants, fillers, fibers, waxes, fusion promoters, antioxidants, antistatic agents, release agents, lubricants, additional resins, and heat distortion temperature modifiers.

23. The method of claim 14, wherein the at least one polyvinyl chloride resin is a polyvinyl chloride resin, chlorinated polyvinyl chloride resin, or alloys thereof.

24. The method of claim 14, wherein the polyvinyl chloride formulation is rigid.

25. An article produced by the method of claim 14, wherein the article has an increase in $T_g$ and HDTUL (heat distortion temperature under load) of at least 3° C. compared to an article prepared with only the polyvinyl chloride formulation.

26. An article produced by the method of claim 14, wherein the article has a $T_g$ up to 110° C. or a HDTUL of up to 130° C.

27. An article produced by the method of claim 14, wherein the article is suitable for use in the following applications: building, construction, corner profiles, decking, fencing, railings, soffits, vinyl siding, cladding, window profiles, door frames, siding, fences, gutters, pipes, piping, appliances, electrical enclosures, electronic enclosures, electrical junction boxes, automobile interiors, automobile exteriors, appliances, office equipment, medical devices, sign enclosures, aircraft interiors, and high temperature applications.

28. An article produced by the method of claim 14, in the form of a film, a sheet or an injected molded part.

* * * * *